United States Patent
Yang et al.

(10) Patent No.: US 10,813,128 B2
(45) Date of Patent: Oct. 20, 2020

(54) MANAGEMENT METHOD AND APPARATUS FOR PATTERN ON UNLICENSED CARRIER

(71) Applicant: ZTE CORPORATION, Shenzhen, Guangdong (CN)

(72) Inventors: Ling Yang, Shenzhen (CN); Wei Gou, Shenzhen (CN); Yajun Zhao, Shenzhen (CN)

(73) Assignee: ZTE CORPORATION (CN)

( * ) Notice: Subject to any disclaimer, the term of this patent is extended or adjusted under 35 U.S.C. 154(b) by 1 day.

(21) Appl. No.: 15/740,385

(22) PCT Filed: Jun. 22, 2016

(86) PCT No.: PCT/CN2016/086761
§ 371 (c)(1),
(2) Date: Jan. 15, 2018

(87) PCT Pub. No.: WO2017/000824
PCT Pub. Date: Jan. 5, 2017

(65) Prior Publication Data
US 2018/0192441 A1    Jul. 5, 2018

(30) Foreign Application Priority Data
Jul. 1, 2015    (CN) .......................... 2015 1 0377115

(51) Int. Cl.
*H04J 3/00*    (2006.01)
*H04W 74/08*    (2009.01)
(Continued)

(52) U.S. Cl.
CPC ....... *H04W 74/0816* (2013.01); *H04L 5/0048* (2013.01); *H04W 16/14* (2013.01);
(Continued)

(58) Field of Classification Search
CPC .......................... H04L 5/0048; H04W 16/14; H04W 72/1215; H04W 74/002; H04W 74/0808; H04W 74/0816
See application file for complete search history.

(56) References Cited

U.S. PATENT DOCUMENTS 8,085,785 B2    12/2011    Tanno
8,111,661 B2    2/2012    Kim
(Continued)

FOREIGN PATENT DOCUMENTS

| CN | 101056279 A | 10/2007 |
|----|-------------|---------|
| CN | 103220676 A | 7/2013 |

(Continued)

OTHER PUBLICATIONS

International Search Report in international application No. PCT/CN2016/086761, dated Sep. 14, 2016, 2 pgs.
(Continued)

*Primary Examiner* — Minh Trang T Nguyen
(74) *Attorney, Agent, or Firm* — McDonald Hopkins LLC

(57) ABSTRACT

A management method and apparatus for a pattern on an unlicensed carrier. The method comprises: transmission nodes generate and exchange clear channel assessment (CCA) patterns, the CCA patterns comprising patterns used in different stages of clear channel assessment (CCA) detection, a pattern used during data transmission, and a pattern for CCA detection, and the transmission nodes comprising one or more of a system-level node, a cell-level node, or a UE-level node.

16 Claims, 5 Drawing Sheets generate and exchange, by transmission nodes, CCA patterns which includes: patterns used in different stages of CCA detection, a pattern used for data transmission, and a CCA detection pattern — S110

(51) Int. Cl.
*H04W 16/14* (2009.01)
*H04W 74/00* (2009.01)
*H04L 5/00* (2006.01)
*H04W 72/12* (2009.01)

(52) U.S. Cl.
CPC ..... *H04W 72/1215* (2013.01); *H04W 74/002* (2013.01); *H04W 74/0808* (2013.01)

(56) References Cited

U.S. PATENT DOCUMENTS

| | | | |
|---|---|---|---|
| 2014/0071874 A1* | 3/2014 | Li | H04N 19/65 370/311 |
| 2015/0043523 A1 | 2/2015 | Luo et al. | |
| 2015/0049715 A1* | 2/2015 | Yerramalli | H04L 5/1469 370/329 |
| 2015/0098349 A1 | 4/2015 | Wei et al. | |
| 2015/0110066 A1* | 4/2015 | Gaal | H04W 72/0453 370/330 |
| 2015/0249990 A1* | 9/2015 | Kadiyala | H04W 72/085 370/252 |
| 2016/0143014 A1* | 5/2016 | Mukherjee | H04W 74/0816 370/330 |

FOREIGN PATENT DOCUMENTS

| | | |
|---|---|---|
| CN | 104038950 A | 9/2014 |
| CN | 104301273 A | 1/2015 |
| CN | 104486013 A | 4/2015 |
| CN | 104539405 A | 4/2015 |

OTHER PUBLICATIONS

English Translation of the Written Opinion of the International Search Authority in international application No. PCT/CN2016/086761, dated Sep. 14, 2016, 5 pgs.

Supplementary European Search Report in European application No. 16817188.2, dated May 25, 2018, 6 pgs.

3GPP TR 36. 889 V13. 0. 0 (Jun. 2015), 3rd Generation Partnership Project; Technical Specification Group Radio Access Network; Study on Licensed-Assisted Access to Unlicensed Spectrum (Release 13), Jun. 18, 2015 (Jun. 18, 2015), section 7.1. 87 pgs.

* cited by examiner generate and exchange, by transmission nodes, CCA patterns which includes: patterns used in different stages of CCA detection, a pattern used for data transmission, and a CCA detection pattern —S110

FIG. 1

MANAGEMENT METHOD AND APPARATUS FOR PATTERN ON UNLICENSED CARRIER

TECHNICAL FIELD

The present disclosure relates to, but not limited to, the field of communications, and in particular to a method and device for managing a pattern on an unlicensed carrier.

BACKGROUND

So far, it is well known that a Long Term Evolution (LTE) is deployed and operated in a licensed carrier. However, as a data service increases rapidly, in the near future, the licensed carrier will not bear such a huge data volume any longer. Therefore, an important direction of LTE development is to deploy an LTE on an unlicensed carrier and to share, via the unlicensed carrier, a data volume in a licensed carrier. In view of this, an LTE Rel-13 version has started to launch a research project on an important issue of operating an LTE system by using an unlicensed carrier since September, 2014. This technology will enable the LTE system to use a currently existing unlicensed carrier, so that potential frequency domain resources of the LTE system are greatly improved, and the LTE system can obtain a lower frequency domain cost.

It is well known that the unlicensed carrier has the following characteristics:

1. for free/low cost (it is unnecessary to purchase an unlicensed frequency domain, and a frequency domain resource is zero-cost);
2. low access requirement, and low cost (individuals and enterprises may participate in deployment, and equipment of equipment manufacturers may be randomly deployed);
3. large available bandwidth (both unlicensed bands of 5 GHz and 2.4 GHz are usable);
4. resource sharing (when multiple different systems are operated therein or different operators of the same system are operated therein, some resource sharing modes may be taken into consideration, thereby improving the frequency domain efficiency);
5. many radio access technologies (across different communication standards, difficult collaboration, and diversified network topology);
6. many radio access stations (large user quantity, large collaboration difficulty, and large centralized management overhead); and
7. many applications (multiple services mentioned may be operated therein, such as Machine-to-Machine (M2M), and Vehicle-to-Vehicle (V2V)).

However, since an unlicensed carrier obtains a right of use of an LTE system by means of an opportunity competition, how to improve the frequency efficiency of an unlicensed carrier resource becomes a problem to be urgently solved. If it is necessary to execute Clear Channel Assessment (CCA) detection on an entire system bandwidth before at least one of an evolved Node B (eNB) or a User Equipment (UE) use an unlicensed carrier according to CCA detection (i.e., CCA detection is energy detection on the entire system bandwidth) in the related art, after it is detected that a channel is vacant, the eNB or the UE can use the carrier resource; and as for an eNB or a UE having a small service volume, the resource may be greatly wasted. In addition, when continuously executing CCA detection, an eNB or a UE under the same system or the same operator discovers that a channel is occupied by nodes under the same cell or the same operator or the same system so as not to be used, thereby causing low utilization efficiency of a frequency domain and poor system performance.

SUMMARY

The following is a brief introduction for a subject described herein in detail. The brief introduction is not intended to restrict the scope of protection of claims.

The embodiments of the disclosure provide a method and device for managing a pattern on an unlicensed carrier, capable of solving the problem in the related art of poor system performance caused by low utilization efficiency of the frequency domain.

The embodiments of the disclosure are as follows.

A method for managing a pattern on an unlicensed carrier includes the steps as follows.

Transmission nodes generate and exchange CCA patterns, the CCA patterns including: patterns used in different stages of CCA detection, a pattern used for data transmission, and a CCA detection pattern, and the transmission nodes including one or more of the following types: system-level nodes, cell-level nodes and UE-level nodes.

Alternatively, the different stages of CCA detection include at least one of the following stages:

a non-occupancy period;

a signal reserving period; and a data transmission period.

Alternatively, a pattern used for CCA detection during the non-occupancy period includes one of the following:

a CCA detection pattern having equal intervals in the frequency domain and adopting a Resource Block (RB) as a minimum resource granularity;

a CCA detection pattern having unequal intervals in the frequency domain and adopting an RB as a minimum resource granularity;

a CCA detection pattern having equal intervals in the frequency domain and adopting a Resource Element (RE) as a minimum resource granularity;

a CCA detection pattern having unequal intervals in the frequency domain and adopting an RE as a minimum resource granularity;

a sub-band-level CCA detection pattern having equal intervals in the frequency domain; or a sub-band-level CCA detection pattern having unequal intervals in the frequency domain.

Alternatively, a pattern used for CCA detection during the signal reserving period includes one of the following:

if a reserved signal is sent on an entire bandwidth, there is no CCA detection pattern;

if a reserved signal is sent on an entire bandwidth, frequency domain resources in one-to-one correspondence to CCA detection patterns are reserved for CCA pattern detection performed by reused nodes during the signal reserving period; and if a reserved signal is sent in frequency domain resources in one-to-one correspondence to CCA detection patterns, a pattern for sending the reserved signal is taken as a pattern used for CCA pattern detection performed by reused nodes during the signal reserving period.

Alternatively, the reserved signal sent during the signal reserving period includes one of the following:

a Sounding Reference Signal (SRS), a preamble, a Primary/Secondary Synchronization Sequence (PSS/SSS) or a predetermined identifier.

Alternatively, when an SRS is taken as a reserved signal of a reserved signaling device, the SRS is sent before uplink data is sent.

Alternatively, it is determined that the reused nodes perform CCA detection successfully during the signal reserving period in accordance with one of the following manners:

manner 1: in case of sending a reserved signal on frequency domain resources in one-to-one correspondence to CCA detection patterns, if it is detected that a channel is busy on a resource of a CCA frequency domain pattern and it is detected that the channel is vacant on other frequency domain resources, it is regarded that the channel is available;

manner 2: in case of sending a reserved signal on frequency domain resources in one-to-one correspondence to CCA detection patterns, a system bandwidth is utilized by multiple nodes to send a reserved signal in a frequency division multiplexing manner, and the nodes detect that a channel is busy on corresponding resources of CCA frequency domain patterns and detect that the channel is also busy on other frequency domain resources, then the nodes detect whether the channel is vacant on pre-set REs of the CCA frequency domain patterns, and it is regarded that the channel is available when it is detected that the channel is vacant; and manner 3: in case of sending a reserved signal on an entire bandwidth and reserving frequency domain resources in one-to-one correspondence to CCA detection patterns, if it is detected that a channel is vacant on corresponding resources of CCA frequency domain patterns and it is detected that the channel is busy on other frequency domain resources, it is regarded that the channel is available.

Alternatively, a pattern used for CCA detection during the data transmission period includes one of the following:

if data is transmitted on an entire bandwidth, there is no CCA detection pattern;

if data is transmitted on an entire bandwidth, frequency domain resources in one-to-one correspondence to CCA detection patterns are reserved for CCA pattern detection performed by reused nodes during the data transmission period;

if data is transmitted on an entire bandwidth, pre-set REs on frequency domain resources in one-to-one correspondence to CCA detection patterns are reserved, or pre-set frequency domain REs within the data transmission period are reserved, for CCA pattern detection performed by reused nodes during the data transmission period; and if data is transmitted in frequency domain resources in one-to-one correspondence to CCA detection patterns, a pattern for transmitting the data is taken as a pattern used for CCA pattern detection performed by reused nodes during the signal reserving period.

Alternatively, it is determined that the reused nodes perform CCA detection successfully during the data transmission period in accordance with one of the following manners:

manner 1: when data is transmitted on an entire system bandwidth and frequency domain resources in one-to-one correspondence to CCA detection patterns are reserved, if it is detected that a channel is vacant on corresponding reserved resources of CCA frequency domain patterns and it is detected that the channel is busy on other frequency domain resources, it is determined that the channel is available;

manner 2: when data is transmitted on an entire system bandwidth in a frequency division multiplexing manner, it is detected that a channel is busy on corresponding data transmission resources of CCA frequency domain patterns and it is detected that the channel is also busy on other frequency domain resources, so nodes detect whether the channel is vacant on reserved vacant REs on data transmission resources corresponding to the CCA frequency domain patterns, and it is regarded that the channel is available when it is detected that the channel is vacant; and manner 3: when data is transmitted on an entire bandwidth and pre-set REs on frequency domain resources are punched for channel availability determination performed by reused nodes during the data transmission period, if it is detected that the channel is busy on corresponding resources of CCA frequency domain patterns and it is detected that the channel is also busy on other frequency domain resources, then it is continuously detected whether the channel is vacant on reserved REs of the CCA frequency domain patterns or reserved REs on the frequency domain resources, and it is regarded that the channel is available when it is detected that the channel is vacant.

Alternatively, the pattern used for data transmission includes:

data is transmitted on an entire system bandwidth;

data is transmitted on an entire system bandwidth, and frequency domain resources in one-to-one correspondence to CCA detection patterns are reserved and not used for data transmission;

data is transmitted on an entire system bandwidth, and pre-set RE resources in frequency domain resources in one-to-one correspondence to CCA detection patterns are reserved and not used for data transmission; and data is transmitted on frequency domain resources in one-to-one correspondence to CCA detection patterns.

Alternatively, locations of the CCA detection patterns used for data transmission are locations of frequency domain resources on one or more symbols in a subsequent subframe, where the frequency domain resources are resources in one-to-one correspondence to frequency domain locations of the CCA detection patterns, or are RE resources in frequency domain resources corresponding to the CCA detection patterns, or pre-set RE resources on the frequency domain.

Alternatively, the one or more symbols in the subsequent subframe is/are a first symbol or first several symbols in the subframe; and, a location of an Orthogonal Frequency Division Multiplexing (OFDM) symbol or a punching location of an RE of a frequency domain resource corresponding to the symbol is a location other than locations of used reference signals and channels.

Alternatively, the used reference signals and channels include one or more of the following: a Demodulation Reference Signal (DMRS), an SRS, a Physical Downlink Control Channel (PDCCH), a Physical Uplink Control Channel (PUCCH), a Cell Reference Signal (CRS), and a Channel State Information Reference Signal (CSI-RS).

Alternatively, the system-level nodes includes one or more of the following types: all nodes in a Licensed Assisted Access (LAA) system, or all nodes in an operator network, where the system-level nodes perform CCA detection by using a same CCA pattern.

The cell-level nodes include one or more of the following types: intra-cell nodes, nodes between different cells, and nodes in different cells, where the intra-cell nodes perform CCA detection by using a unified CCA pattern, and the nodes between different cells or the nodes in different cells perform CCA detection by using different CCA patterns.

The UE-level nodes include one or more of the following types: different UEs, different UE groups, or UEs in the same UE group, where different UEs or different UE groups perform CCA detection by using different CCA patterns, and the UEs in the same UE group perform CCA detection by using the same CCA pattern.

Alternatively, the action that the system-level nodes perform CCA detection by using a same CCA pattern includes one of the following:

the system-level nodes perform CCA detection by using a same RE-level CCA pattern;

the system-level nodes perform CCA detection by using a same RB-level CCA pattern; and the system-level nodes perform CCA detection by using a same sub-band-level CCA pattern.

Alternatively, when the system-level nodes include all nodes in the operator network, the action that the system-level nodes perform CCA detection by using a same CCA pattern includes one of the following:

all nodes in the operator network perform CCA detection by using a same RE-level CCA pattern;

all nodes in the operator network perform CCA detection by using a same RB-level CCA pattern; and all nodes in the operator network perform CCA detection by using a same sub-band-level CCA pattern.

Alternatively, the action that the intra-cell nodes perform CCA detection by using the same CCA pattern includes one of the following:

the intra-cell nodes perform CCA detection by using a same RE-level CCA pattern;

the intra-cell nodes perform CCA detection by using a same RB-level CCA pattern; and the intra-cell nodes perform CCA detection by using a same sub-band-level CCA pattern.

Alternatively, the action that the nodes between different cells or the nodes in different cells perform CCA detection by using different CCA patterns includes one of the following:

the nodes between different cells or the nodes in different cells perform CCA detection on respective resources by using different RE-level CCA patterns;

the nodes between different cells or the nodes in different cells perform CCA detection on respective resources by using different RB-level CCA patterns; and the nodes between different cells or the nodes in different cells perform CCA detection on respective resources by using different sub-band-level CCA patterns.

Alternatively, the action that the UEs in the UE group perform CCA detection by using the same CCA pattern includes one of the following:

the UEs in the UE group perform CCA detection by using a same RE-level CCA pattern;

the UEs in the UE group perform CCA detection by using a same RB-level CCA pattern; and the UEs in the UE group perform CCA detection by using a same sub-band-level CCA pattern.

Alternatively, the action that different UEs or different UE groups perform CCA detection by using different CCA patterns includes one of the following:

different UEs or different UE groups perform CCA detection on respective resources by using different RE-level CCA patterns;

different UEs or different UE groups perform CCA detection on respective resources by using different RB-level CCA patterns; and different UEs or different UE groups perform CCA detection on respective resources by using different sub-band-level CCA patterns.

Alternatively, CCA patterns used by the system-level nodes or the cell-level nodes or the UE-level nodes are appointed, or obtained by high-layer signaling notification.

Alternatively, when the transmission nodes are eNBs, the CCA patterns are exchanged in the following three manners:

manner 1: information of CCA patterns of eNBs is exchanged between eNBs via an X2 interface; after receiving information of a CCA pattern of an eNB, each of adjacent eNBs of the eNB initiates a random backoff counter, and one of the adjacent eNBs of which a random backoff value is first reduced to 0 performs frequency shift for a fixed value on the basis of the received CCA pattern, maintains a CCA pattern list, notifies eNBs adjacent to the eNB of which a random backoff value is first reduced, of the CCA pattern list, and stops an information exchange operation until the list has a predefined number of reusable nodes;

manner 2: an eNB notifies, via an X2 interface, adjacent eNBs of the eNB of a CCA pattern used for CCA detection, and after receiving information of the CCA pattern, each of the adjacent eNBs adopts pattern frequency domain location information contained in the received information of the CCA pattern during the non-occupancy period, the signal reserving period and the data transmission period of the channel; and manner 3: an eNB notifies, via an X2 interface, adjacent eNBs of the eNB of information of a CCA pattern, and after receiving the information of the CCA pattern, each of the adjacent eNBs sends feedback information for the CCA pattern.

Alternatively, in the manner 1, if random backoff values of multiple eNBs are reduced to 0 at the same time, any one of the following operations is executed:

each of the multiple eNBs generates a random number, and determines a shift of a CCA pattern of the eNB according to a magnitude of the random number;

a random backoff mechanism is re-executed; and a main eNB is selected, and CCA patterns allocated to remaining eNBs by the main eNB are received.

Alternatively, when the transmission nodes are UEs, exchange of the CCA patterns includes the operations as follows.

The UEs receive CCA patterns for CCA detection, broadcast by an eNB; or, the UEs receive high-layer signaling, where the high-layer signaling include the CCA patterns for CCA detection performed by the UEs.

Alternatively, the CCA patterns are determined by one or more of a frequency domain initial location, a frequency domain shift, a resource successive length, a cluster size, a period T, a frequency domain bandwidth or a cluster quantity.

Alternatively, a frequency domain initial location of a node is calculated as follows:

$$k=(v+fv_{shift}) \bmod N_{resource}$$

$$v=0,1,\ldots,f-1, v_{shift}=N_{ID}^{cell} \bmod N$$

where k denotes the frequency domain initial location, f denotes a number of resources successively occupied by the node, $v_{shift}$ denotes a frequency domain shift, N denotes a total number of reused nodes, $N_{resource}$ denotes a total number of resources, and $N_{ID}^{Cell}$ denotes an Identifier (ID) of a cell.

A device for managing a pattern on an unlicensed carrier is applied to a transmission node. The transmission node includes one or more of the following types: system-level nodes, cell-level nodes and UE-level nodes. The device includes:

a management module, configured to generate and exchange CCA patterns, the CCA patterns including: patterns used in different stages of CCA detection, a pattern used for data transmission, and a CCA detection pattern.

Alternatively, the different stages of CCA detection include at least one of the following stages:
  a non-occupancy period;
  a signal reserving period; and
  a data transmission period.

Alternatively, a pattern used for CCA detection during the non-occupancy period includes one of the following:
  a CCA detection pattern having equal intervals in the frequency domain and adopting an RB as a minimum resource granularity;
  a CCA detection pattern having unequal intervals in the frequency domain and adopting an RB as a minimum resource granularity;
  a CCA detection pattern having equal intervals in the frequency domain and adopting an RE as a minimum resource granularity;
  a CCA detection pattern having unequal intervals in the frequency domain and adopting an RE as a minimum resource granularity;
  a sub-band-level CCA detection pattern having equal intervals in the frequency domain; or
  a sub-band-level CCA detection pattern having unequal intervals in the frequency domain.

Alternatively, a pattern used for CCA detection during the signal reserving period includes one of the following:
  if a reserved signal is sent on an entire bandwidth, there is no CCA detection pattern;
  if a reserved signal is sent on an entire bandwidth, frequency domain resources in one-to-one correspondence to CCA detection patterns are reserved for CCA pattern detection performed reused nodes during the signal reserving period; and
  if a reserved signal is sent in frequency domain resources in one-to-one correspondence to CCA detection patterns, a pattern for sending the reserved signal is taken as a pattern used for CCA pattern detection performed by reused nodes during the signal reserving period.

Alternatively, the reserved signal sent during the signal reserving period includes one of the following:
  an SRS, a preamble, a PSS/SSS or a predetermined identifier.

Alternatively, when an SRS is taken as a reserved signal of a reserved signaling device, the SRS is sent before uplink data is sent.

Alternatively, it is determined that the reused nodes perform CCA detection successfully during the signal reserving period in accordance with one of the following manners:
  manner 1: in case of sending a reserved signal on frequency domain resources in one-to-one correspondence to CCA detection patterns, if it is detected that a channel is busy on a resource of a CCA frequency domain pattern and it is detected that the channel is vacant on other frequency domain resources, it is regarded that the channel is available;
  manner 2: in case of sending a reserved signal on frequency domain resources in one-to-one correspondence to CCA detection patterns, a system bandwidth is utilized by multiple nodes to send a reserved signal in a frequency division multiplexing manner, and the nodes detect that a channel is busy on corresponding resources of CCA frequency domain patterns and detect that the channel is also busy on other frequency domain resources, then the nodes detect whether the channel is vacant on pre-set REs of the CCA frequency domain patterns, and it is regarded that the channel is available when it is detected that the channel is vacant; and
  manner 3: in case of sending a reserved signal on an entire bandwidth and reserving frequency domain resources in one-to-one correspondence to CCA detection patterns, if it is detected that a channel is vacant on corresponding resources of CCA frequency domain patterns and it is detected that the channel is busy on other frequency domain resources, it is regarded that the channel is available.

Alternatively, a pattern used for CCA detection during the data transmission period includes one of the following:
  if data is transmitted on an entire bandwidth, there is no CCA detection pattern;
  if data is transmitted on an entire bandwidth, frequency domain resources in one-to-one correspondence to CCA detection patterns are reserved for CCA pattern detection performed by reused nodes during the data transmission period;
  if data is transmitted on an entire bandwidth, pre-set REs on frequency domain resources in one-to-one correspondence to CCA detection patterns are reserved, or pre-set frequency domain REs within the data transmission period are reserved, for CCA pattern detection performed by reused nodes during the data transmission period; and
  if data is transmitted in frequency domain resources in one-to-one correspondence to CCA detection patterns, a pattern for transmitting the data is taken as a pattern used for CCA pattern detection performed by reused nodes during the signal reserving period.

Alternatively, it is determined that the reused nodes perform CCA detection successfully during the data transmission period in accordance with one of the following manners:
  manner 1: when data is transmitted on an entire system bandwidth and frequency domain resources in one-to-one correspondence to CCA detection patterns are reserved, if it is detected that a channel is vacant on corresponding reserved resources of CCA frequency domain patterns and it is detected that the channel is busy on other frequency domain resources, it is determined that the channel is available;
  manner 2: when data is transmitted on an entire system bandwidth in a frequency division multiplexing manner, it is detected that a channel is busy on corresponding data transmission resources of CCA frequency domain patterns and it is detected that the channel is also busy on other frequency domain resources, then the nodes detect whether the channel is vacant on reserved vacant REs on data transmission resources corresponding to the CCA frequency domain patterns, and it is regarded that the channel is available when it is detected that the channel is vacant; and
  manner 3: when data is transmitted on an entire bandwidth and pre-set REs on frequency domain resources are punched for channel availability determination performed by reused nodes during the data transmission period, if it is detected that the channel is busy on corresponding resources of CCA frequency domain patterns and it is detected that the channel is also busy on other frequency domain resources, then it is continuously detected whether the channel is vacant on reserved REs of the CCA frequency domain patterns or reserved REs on the frequency domain resources, and it is regarded that the channel is available when it is detected that the channel is vacant.

Alternatively, the pattern used for data transmission includes:

data is transmitted on an entire system bandwidth;

data is transmitted on an entire system bandwidth, and frequency domain resources in one-to-one correspondence to CCA detection patterns are reserved and not used for data transmission;

data is transmitted on an entire system bandwidth, and pre-set RE resources in frequency domain resources in one-to-one correspondence to CCA detection patterns are reserved and not used for data transmission; and data is transmitted on frequency domain resources in one-to-one correspondence to CCA detection patterns.

Alternatively, locations of the CCA detection patterns used for data transmission are locations of frequency domain resources on one or more symbols in a subsequent subframe, where the frequency domain resources are resources in one-to-one correspondence to frequency domain locations of the CCA detection patterns, or are RE resources in frequency domain resources corresponding to the CCA detection patterns, or pre-set RE resources on the frequency domain.

Alternatively, the one or more symbols in the subsequent subframe is/are a first symbol or first several symbols in the subframe; and, a location of an OFDM symbol or a punching location of an RE of a frequency domain resource corresponding to the symbol is a location other than locations of used reference signals and channels.

Alternatively, the used reference signals and channels include one or more of the following: a DMRS, an SRS, a PDCCH, a PUCCH, a CRS, and a CSI-RS.

Alternatively, the system-level nodes include one or more of the following types: all nodes in an LAA system, or all nodes in an operator network, where the system-level nodes perform CCA detection by using a same CCA pattern.

The cell-level nodes include one or more of the following types: intra-cell nodes, nodes between different cells, and nodes in different cells, where the intra-cell nodes perform CCA detection by using a unified CCA pattern, and the nodes between different cells or the nodes in different cells perform CCA detection by using different CCA patterns.

The UE-level nodes include one or more of the following types: different UEs, different UE groups, or UEs in the same UE group, where different UEs or different UE groups perform CCA detection by using different CCA patterns, and the UEs in the same UE group perform CCA detection by using the same CCA pattern.

Alternatively, the action that the system-level nodes perform CCA detection by using a same CCA pattern includes one of the following:

the system-level nodes perform CCA detection by using a same RE-level CCA pattern;

the system-level nodes perform CCA detection by using a same RB-level CCA pattern; and the system-level nodes perform CCA detection by using a same sub-band-level CCA pattern.

Alternatively, when the system-level nodes include all nodes in the operator network, the action that the system-level nodes perform CCA detection by using a same CCA pattern includes one of the following:

all nodes in the operator network perform CCA detection by using a same RE-level CCA pattern;

all nodes in the operator network perform CCA detection by using a same RB-level CCA pattern; and all nodes in the operator network perform CCA detection by using a same sub-band-level CCA pattern.

Alternatively, the action that the intra-cell nodes perform CCA detection by using the same CCA pattern includes one of the following:

the intra-cell nodes perform CCA detection by using a same RE-level CCA pattern;

the intra-cell nodes perform CCA detection by using a same RB-level CCA pattern; and the intra-cell nodes perform CCA detection by using a same sub-band-level CCA pattern.

Alternatively, the action that the nodes between different cells or the nodes in different cells perform CCA detection by using different CCA patterns includes one of the following:

the nodes between different cells or the nodes in different cells perform CCA detection on respective resources by using different RE-level CCA patterns;

the nodes between different cells or the nodes in different cells perform CCA detection on respective resources by using different RB-level CCA patterns; and the nodes between different cells or the nodes in different cells perform CCA detection on respective resources by using different sub-band-level CCA patterns.

Alternatively, the action that the UEs in the UE group perform CCA detection by using the same CCA pattern includes one of the following:

the UEs in the UE group perform CCA detection by using a same RE-level CCA pattern;

the UEs in the UE group perform CCA detection by using a same RB-level CCA pattern; and the UEs in the UE group perform CCA detection by using a same sub-band-level CCA pattern.

Alternatively, the action that different UEs or different UE groups perform CCA detection by using different CCA patterns includes one of the following:

different UEs or different UE groups perform CCA detection on respective resources by using different RE-level CCA patterns;

different UEs or different UE groups perform CCA detection on respective resources by using different RB-level CCA patterns; and different UEs or different UE groups perform CCA detection on respective resources by using different sub-band-level CCA patterns.

Alternatively, CCA patterns used by the system-level nodes or the cell-level nodes or the UE-level nodes are appointed, or obtained by high-layer signaling notification.

Alternatively, when the management module is applied to an eNB, the management module exchanges the CCA patterns in the following three manners:

manner 1: information of CCA patterns of corresponding eNBs in which the management modules are located between the management modules via an X2 interface; after receiving information of a CCA pattern of an eNB, each of the management modules of adjacent eNBs of the eNB initiates a random backoff counter; and one of the management modules of which a random backoff value is first reduced to 0 performs frequency shift for a fixed value on the basis of the received CCA pattern, maintains a CCA pattern list, notifies management modules of eNBs adjacent to the eNB of which a random backoff values is first reduced, of the CCA pattern list, and stops an information exchange operation until the list has a predefined number of reusable nodes (which may be the specified number of reusable nodes in the related art);

manner 2: a management module of an eNB notifies, via an X2 interface, management module of adjacent eNBs of the eNB of a CCA pattern used during CCA detection, and after receiving information of the CCA patterns, each of the management modules of the adjacent eNBs adopts pattern frequency domain location information contained in the received information of the CCA pattern during the non-occupancy period, the signal reserving period and the data transmission period of the channel; and manner 3: a management module of an eNB notifies, via an X2 interface, management modules of adjacent eNBs of the eNB of information of a CCA pattern, and after receiving the information of CCA pattern, each of the management modules of the adjacent eNBs sends feedback information for the CCA pattern.

Alternatively, in the manner 1, if random backoff values of management modules of multiple eNBs are reduced to 0 at the same time, any one of the following operations is executed:

each of the management modules of the multiple eNBs generates a random number, and determines a shift of a CCA pattern of the management module according to a magnitude of the random number;

a random backoff mechanism is re-executed; and a main eNB is selected, and CCA patterns allocated to remaining eNBs by the management module of the main eNB are received.

Alternatively, when the management module is applied to a UE, the action that the management module exchanges the CCA patterns includes the operations as follows.

CCA patterns for CCA detection, broadcast by an eNB, are received; or, high-layer signaling is received, where the high-layer signaling include the CCA patterns for CCA detection performed by the UE.

Alternatively, the CCA patterns are determined by one or more of a frequency domain initial location, a frequency domain shift, a resource successive length, a cluster size, a period T, a frequency domain bandwidth or a cluster quantity.

Alternatively, a frequency domain initial location of a node is calculated as follows:

$$k = (v + f v_{shift}) \mod N_{resource}$$

$$v = 0, 1, \ldots, f-1, v_{shift} = N_{ID}^{Cell} \mod N$$

where k denotes the frequency domain initial location, f denotes the number of resources successively occupied by a node, $v_{shift}$ denotes a frequency domain shift, N denotes a total number of reused nodes, $N_{resource}$ denotes a total number of resources, and $N_{ID}^{Cell}$ denotes an ID of a cell.

A computer-readable storage medium stores a computer-executable instruction. The computer-executable instruction is used to execute the above-mentioned method.

The embodiments of the disclosure can increase the frequency multiplexing and frequency division multiplexing frequency of an eNB/eNB group or a UE/UE group on an unlicensed carrier, and reduce the complexity of identification of available resources via reused nodes in the same operator or the same cell. In addition, interference between neighbor nodes can be reduced, thereby improving the system performance to a certain extent.

After the drawings and the detailed descriptions are read and understood, other aspects may be understood.

BRIEF DESCRIPTION OF DRAWINGS

FIG. 1 shows a diagram of a method for managing a pattern on an unlicensed carrier according to an embodiment of the disclosure.

FIG. 4 (b) illustrates a diagram of a pattern adopted during a non-occupancy period and a data transmission period according to an embodiment of the disclosure.

DETAILED DESCRIPTION

Figure 2:
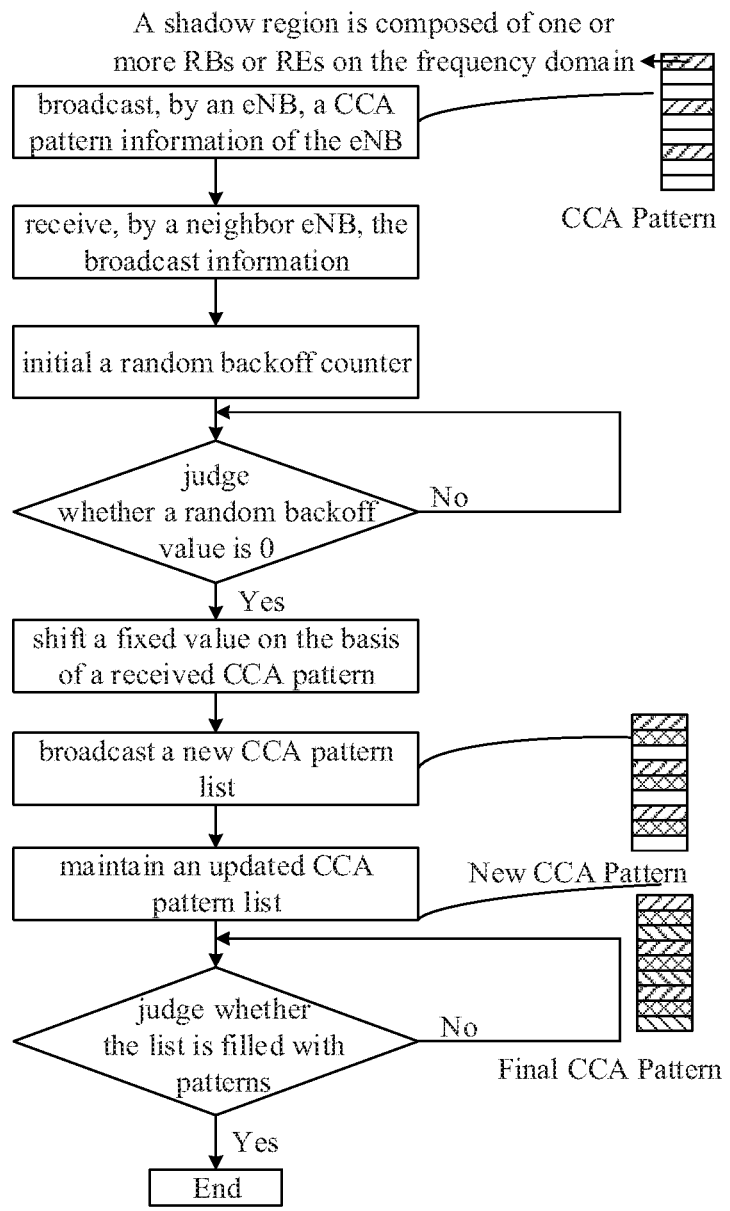
FIG. 2 shows a flowchart of exchange of respective CCA patterns adopted during CCA detection between stations according to an embodiment of the disclosure.

It is important to note that the embodiments in the present application and the characteristics in the embodiments may be combined mutually under the condition of no conflicts.

The embodiment of the disclosure provides a method for managing a pattern on an unlicensed carrier. As shown in FIG. 1, the method includes step S110.

In S110, transmission nodes generate and exchange CCA patterns, the CCA patterns including: patterns used in different stages of CCA detection, a pattern used for data transmission, and a CCA detection pattern, and the transmission nodes including one or more of the following: system-level nodes, cell-level nodes and UE-level nodes.

That is, in the method, generation and exchange of patterns used in different stages of CCA detection, a pattern used for data transmission and a CCA detection pattern via a system-level or cell-level node or UE-level node are involved.

Alternatively, the different stages of CCA detection include at least one of the following stages:

a non-occupancy period;

a signal reserving period; and a data transmission period.

Alternatively, a pattern used for CCA detection during the non-occupancy period includes one of the following:

a CCA detection pattern having equal intervals in the frequency domain and adopting an RB as a minimum resource granularity;

a CCA detection pattern having unequal intervals in the frequency domain and adopting an RB as a minimum resource granularity;

a CCA detection pattern having equal intervals in the frequency domain and adopting an RE as a minimum resource granularity;

a CCA detection pattern having unequal intervals in the frequency domain and adopting an RE as a minimum resource granularity;

a sub-band-level CCA detection pattern having equal intervals in the frequency domain; or a sub-band-level CCA detection pattern having unequal intervals in the frequency domain.

Alternatively, a pattern used for CCA detection during the signal reserving period includes one of the following:

if a reserved signal is sent on an entire bandwidth, there is no CCA detection pattern;

if a reserved signal is sent on an entire bandwidth, frequency domain resources in one-to-one correspondence to CCA detection patterns are reserved for CCA pattern detection performed by reused nodes during the signal reserving period; and if a reserved signal is sent in frequency domain resources in one-to-one correspondence to CCA detection patterns, a pattern for sending the reserved signal is taken as a pattern used for CCA pattern detection performed by reused nodes during the signal reserving period.

Alternatively, the reserved signal sent during the signal reserving period includes one of the following:

an SRS, a preamble, a PSS/SSS or a predetermined identifier.

Alternatively, when an SRS is taken as a reserved signal of a reserved signaling device, the SRS is sent before uplink data is sent.

Alternatively, it is determined that the reused nodes perform CCA detection successfully during the signal reserving period in accordance with one of the following manners:

manner 1: in case of sending a reserved signal on frequency domain resources in one-to-one correspondence to CCA detection patterns, if it is detected that a channel is busy on a resource of a CCA frequency domain pattern and it is detected that the channel is vacant on other frequency domain resources, it is regarded that the channel is available;

manner 2: in case of sending a reserved signal on frequency domain resources in one-to-one correspondence to CCA detection patterns, a system bandwidth is utilized by multiple nodes to send a reserved signal in a frequency division multiplexing manner, and the nodes detect that a channel is busy on corresponding resources of CCA frequency domain patterns and detect that the channel is also busy on other frequency domain resources, then the nodes detect whether the channel is vacant on pre-set REs of the CCA frequency domain patterns, and it is regarded that the channel is available when it is detected that the channel is vacant; and manner 3: in case of sending a reserved signal on an entire bandwidth and reserving frequency domain resources in one-to-one correspondence to CCA detection patterns, if it is detected that a channel is vacant on corresponding resources of CCA frequency domain patterns and it is detected that the channel is busy on other frequency domain resources, it is regarded that the channel is available.

Alternatively, a pattern used for CCA detection during the data transmission period includes one of the following:

if data is transmitted on an entire bandwidth, there is no CCA detection pattern;

if data is transmitted on an entire bandwidth, frequency domain resources in one-to-one correspondence to CCA detection patterns are reserved for CCA pattern detection performed reused nodes during the data transmission period;

if data is transmitted on an entire bandwidth, pre-set REs on frequency domain resources in one-to-one correspondence to CCA detection patterns are reserved, or pre-set frequency domain REs within the data transmission period are reserved, for CCA pattern detection performed by reused nodes during the data transmission period; and if data is transmitted in frequency domain resources in one-to-one correspondence to CCA detection patterns, a pattern for transmitting the data is taken as a pattern used for CCA pattern detection performed by reused nodes during the signal reserving period.

Alternatively, it is determined that the reused nodes perform CCA detection successfully during the data transmission period in accordance with one of the following manners:

manner 1: when data is transmitted on an entire system bandwidth and frequency domain resources in one-to-one correspondence to CCA detection patterns are reserved, if it is detected that a channel is vacant on corresponding reserved resources of CCA frequency domain patterns and it is detected that the channel is busy on other frequency domain resources, it is determined that the channel is available;

manner 2: when data is transmitted on an entire system bandwidth in a frequency division multiplexing manner, it is detected that a channel is busy on corresponding data transmission resources of CCA frequency domain patterns and it is detected that the channel is also busy on other frequency domain resources, so nodes detect whether the channel is vacant on reserved vacant REs on data transmission resources corresponding to the CCA frequency domain patterns, and it is regarded that the channel is available when it is detected that the channel is vacant; and manner 3: when data is transmitted on an entire bandwidth and pre-set REs on frequency domain resources are punched for channel availability determination performed by reused nodes during the data transmission period, if it is detected that the channel is busy on corresponding resources of CCA frequency domain patterns and it is detected that the channel is also busy on other frequency domain resources, then it is continuously detected whether the channel is vacant on reserved REs of the CCA frequency domain patterns or reserved REs on the frequency domain resources, and it is regarded that the channel is available when it is detected that the channel is vacant.

Alternatively, the pattern used for data transmission includes:

data is transmitted on an entire system bandwidth;

data is transmitted on an entire system bandwidth, and frequency domain resources in one-to-one correspondence to CCA detection patterns are reserved and not used for data transmission;

data is transmitted on an entire system bandwidth, and pre-set RE resources in frequency domain resources in one-to-one correspondence to CCA detection patterns are reserved and not used for data transmission; and data is transmitted on frequency domain resources in one-to-one correspondence to CCA detection patterns.

Alternatively, locations of the CCA detection patterns used for data transmission are locations of frequency domain resources on one or more symbols in a subsequent subframe, where the frequency domain resources are resources in one-to-one correspondence to frequency domain locations of the CCA detection patterns, or are RE resources in frequency domain resources corresponding to the CCA detection patterns, or pre-set RE resources on the frequency domain.

Alternatively, the one or more symbols in the subsequent subframe is/are a first symbol or first several symbols in the subframe; and, a location of an OFDM symbol or a punching location of an RE of a frequency domain resource corresponding to the symbol is a location other than locations of used reference signals and channels.

Alternatively, the used reference signals and channels include one or more of the following: a DMRS, an SRS, a PDCCH, a PUCCH, a CRS, and a CSI-RS.

Alternatively, the system-level nodes include one or more of the following types: all nodes in an LAA system, or all nodes in an operator network, where the system-level nodes perform CCA detection by using a same CCA pattern.

The cell-level nodes include one or more of the following types: intra-cell nodes, nodes between different cells, and nodes in different cells, where the intra-cell nodes perform CCA detection by using a unified CCA pattern, and the nodes between different cells or the nodes in different cells perform CCA detection by using different CCA patterns.

The UE-level nodes include one or more of the following types: different UEs, different UE groups, or UEs in the same UE group, where different UEs or different UE groups perform CCA detection by using different CCA patterns, and the UEs in the same UE group perform CCA detection by using the same CCA pattern.

Alternatively, the action that the system-level nodes perform CCA detection by using a same CCA pattern includes one of the following:

the system-level nodes perform CCA detection by using a same RE-level CCA pattern;

the system-level nodes perform CCA detection by using a same RB-level CCA pattern; and the system-level nodes perform CCA detection by using a same sub-band-level CCA pattern.

Alternatively, when the system-level nodes include all nodes in the operator network, the action that the system-level nodes perform CCA detection by using a same CCA pattern includes one of the following:

all nodes in the operator network perform CCA detection by using a same RE-level CCA pattern;

all nodes in the operator network perform CCA detection by using a same RB-level CCA pattern; and all nodes in the operator network perform CCA detection by using a same sub-band-level CCA pattern.

Alternatively, the action that the intra-cell nodes perform CCA detection by using the same CCA pattern includes one of the following:

the intra-cell nodes perform CCA detection by using a same RE-level CCA pattern;

the intra-cell nodes perform CCA detection by using a same RB-level CCA pattern; and the intra-cell nodes perform CCA detection by using a same sub-band-level CCA pattern.

Alternatively, the action that the nodes between different cells or the nodes in different cells perform CCA detection by using different CCA patterns includes one of the following:

the nodes between different cells or the nodes in different cells perform CCA detection on respective resources by using different RE-level CCA patterns;

the nodes between different cells or the nodes in different cells perform CCA detection on respective resources by using different RB-level CCA patterns; and the nodes between different cells or the nodes in different cells perform CCA detection on respective resources by using different sub-band-level CCA patterns.

Alternatively, the action that the UEs in the UE group perform CCA detection by using the same CCA pattern includes one of the following:

the UEs in the UE group perform CCA detection by using a same RE-level CCA pattern;

the UEs in the UE group perform CCA detection by using a same RB-level CCA pattern; and the UEs in the UE group perform CCA detection by using a same sub-band-level CCA pattern.

Alternatively, the action that different UEs or different UE groups perform CCA detection by using different CCA patterns includes one of the following:

different UEs or different UE groups perform CCA detection on respective resources by using different RE-level CCA patterns;

different UEs or different UE groups perform CCA detection on respective resources by using different RB-level CCA patterns; and different UEs or different UE groups perform CCA detection on respective resources by using different sub-band-level CCA patterns.

Alternatively, CCA patterns used by the system-level nodes or the cell-level nodes or the UE-level nodes are appointed, or obtained by high-layer signaling notification.

Alternatively, when the transmission nodes are eNBs, the CCA patterns are exchanged in the following three manners:

manner 1: information of CCA patterns of eNBs is exchanged between eNBs via an X2 interface; after receiving information of a CCA pattern of an eNB, each of adjacent eNBs of the eNB initiates a random backoff counter, and one of the adjacent eNBs of which a random backoff value is first reduced to 0 performs frequency shift for a fixed value on the basis of the received CCA pattern, maintains a CCA pattern list, notifies eNBs adjacent to the eNB of which a random backoff value is first reduced, of the CCA pattern list, and stops an information exchange operation until the list has a predefined number of reusable nodes;

manner 2: an eNB notifies, via an X2 interface, adjacent eNBs of the eNB of a CCA pattern used for CCA detection, and after receiving information of the CCA pattern, each of the adjacent eNBs adopts pattern frequency domain location information contained in the received information of the CCA pattern during the non-occupancy period, the signal reserving period and the data transmission period of the channel; and manner 3: an eNB notifies, via an X2 interface, adjacent eNBs of the eNB of information of a CCA pattern, and after receiving the information of the CCA pattern, each of the adjacent eNBs sends feedback information for the CCA pattern.

Alternatively, in manner 1, if random backoff values of multiple eNBs are reduced to 0 at the same time, any one of the following operations is executed:

each of the multiple eNBs generates a random number, and determines a shift of a CCA pattern of the eNB according to a magnitude of the random number;

a random backoff mechanism is re-executed; and a main eNB is selected, and CCA patterns allocated to remaining eNBs by the main eNB are received.

Alternatively, when the transmission nodes are UEs, exchange of the CCA patterns includes the operations as follows.

The UEs receive CCA patterns for CCA detection, broadcast by an eNB; or, the UEs receive high-layer signaling, where the high-layer signaling include the CCA patterns for CCA detection performed by the UEs.

Alternatively, the CCA patterns are determined by one or more of a frequency domain initial location, a frequency domain shift, a resource successive length, a cluster size, a period T, a frequency domain bandwidth or a cluster quantity.

Alternatively, a frequency domain initial location of a node is calculated as follows:

$$k=(v+fv_{shift}) \bmod N_{resource}$$

$$v=0,1,\ldots,f-1, v_{shift}=N_{ID}^{Cell} \bmod N$$

where k denotes a frequency domain initial location, f denotes a number of resources successively occupied by the node, $V_{shift}$ denotes a frequency domain shift, N denotes a total number of reused nodes, $N_{resource}$ denotes a total number of resources, and $N_{ID}^{Cell}$ denotes an Identifier (ID) of a cell.

The above-mentioned method is illustrated below with eight embodiments.

First Embodiment

The present embodiment is used to illustrate a flow of exchanging respective CCA patterns adopted during CCA detection between transmission nodes.

Alternatively, in the present embodiment, transmission nodes are stations. CCA patterns are exchanged between the stations in the following manners:

manner 1: a station notifies, via an X2 interface, adjacent eNBs (or referred to as surrounding eNBs and neighbor eNBs) of the station, of an CCA pattern of the station, after receiving pattern information, each of the eNBs acquires its own CCA pattern according to the flow as shown in FIG. 1, and a CCA pattern used by each of adjacent eNBs is finally acquired;

manner 2: a station notifies, via an X2 interface, an adjacent eNB of specific CCA pattern information; and manner 3: a sending eNB notifies, via an X2 interface, an adjacent eNB of information of a CCA pattern, and the adjacent eNB receives the information of the CCA pattern, determines a used CCA pattern according to a surrounding situation thereof, and feeds a piece of information back to the sending eNB.

It is supposed that the quantity of stations for reusing resources on a certain unlicensed carrier is 3, namely eNB1, eNB2 and eNB3. If the three stations belong to the same operator, they perform CCA detection by using the same pattern. Under the situation that the three stations belong to different operators respectively, in order to reduce interference between adjacent stations, different stations perform CCA detection by using different CCA patterns to avoid inter-station interference, so as to achieve the aim of improving the system throughput.

The process of how to implement CCA pattern information exchange between eNBs in the manner 1 will be described in detail below with the flow as shown in FIG. 2.

As shown in FIG. 2, eNB1 notifies, via an X2 interface, neighbor eNBs (such as eNB2 and eNB3) of own CCA pattern information such as a frequency domain bandwidth, a minimum resource granularity (such as an RB or RE), a cluster quantity, the size of each cluster, a cluster initial location or a frequency domain shift relative to a frequency domain starting point, a period T, the quantity of reused nodes, and the like, and a CCA pattern of a frequency domain can be obtained according to one or more of the above-mentioned information.

After receiving the CCA pattern information sent from eNB1, the neighbor eNBs (eNB2 and eNB3) knows that the CCA detection pattern is unavailable, and initiate a random backoff counter immediately. Suppose: a random backoff value generated by eNB2 is 4, and eNB3 generates a random backoff value 2. In this case, it can be seen that the counter of eNB3 in the neighbor eNBs is reduced to 0 first, and when the counter of eNB3 is reduced to 0, eNB3 makes a fixed shift on the basis of the received CCA pattern of eNB1, where the size of the shift may be the size of a cluster (note: the size of a cluster may be RB-level or RE-level). Thus, eNB3 obtains an own CCA pattern to be used subsequently during CCA detection on an unlicensed carrier, updates a CCA pattern list maintained between reused eNBs, and notifies eNB2 and eNB1, still performing random backoff, of a new CCA pattern. At this time, eNB1 only needs to update the own CCA pattern list, and after receiving a new CCA pattern list and a random backoff value 0, eNB2 makes a fixed shift on the basis of the received new CCA pattern by using the method similar to that adopted by eNB3, and notifies of the updated CCA pattern. A station receiving the updated CCA pattern list judges whether the list is filled with patterns, and if the list is filled with patterns, exchange of CCA patterns is stopped. If not, the above-mentioned operation is continued. Here, for example, a method for judging whether the list is filled with patterns includes: judging whether the quantity of nodes in a linked list is identical to the quantity of the reused stations, or judging whether the last information in the linked list is empty.

If multiple stations randomly back off to 0 at the same time, these stations may be exchanged to generate a random number, and determine an own CCA pattern shift in sequence according to the size of the random number; or, a random backoff mechanism is executed again.

An implementation manner provided in the manner 2 will be illustrated as follows.

A station notifies, via an X2 interface, a neighbor eNB of specific CCA pattern information thereof.

In the manner 2, eNB1 notifies, via an X2 interface, eNB2 and eNB3 of a detection pattern adopted during CCA detection. Similarly, if eNB1, eNB2 and eNB3 are eNBs under the same operator, capable of mutually reusing specific unlicensed carrier resources, after receiving the CCA pattern notified by eNB1, eNB2 and eNB3 will consider that they can use this pattern to perform CCA detection. If eNB1, eNB2 and eNB3 are eNBs under different operators, after receiving specific CCA patterns sent by eNB1, eNB2 and eNB3 will directly perform CCA detection according to the respectively-received patterns during a CCA detection period.

Finally, an implementation manner provided in the manner 3 is illustrated.

A sending eNB notifies, via an X2 interface, an adjacent eNB of information of a CCA pattern, and the adjacent eNB receives the information, determines, according to a surrounding situation thereof, a CCA pattern used by the present eNB, and feeds a piece of information back to the sending eNB.

It is supposed that surrounding eNBs around eNB1 include eNB2, eNB3 and eNB4 and surrounding eNBs around eNB2 include eNB5 and eNB6. eNB1 determines, according to CCA patterns used by the own surrounding eNBs, an own pattern adopted during CCA detection, and notifies eNB2 of the pattern. There are two possibilities as follows.

First possibility: eNB1 notifies, via an X2 interface, eNB2 of an own CCA detection pattern, and eNB2 is also required to use the same pattern to perform CCA detection, but after receiving information of this pattern, eNB2 discovers that this patterns conflicts with a pattern used by a neighbor eNB of the present eNB during CCA detection. In this case, eNB2 will feed a piece of information back to eNB1, or determine a new CCA pattern that is different from the pattern of eNB1 and does not conflict with the neighbor eNB of the present eNB, and then notify eNB1 of this new CCA pattern.

Second possibility: eNB1 notifies, via an X2 interface, eNB2 of a detection pattern to be adopted during CCA detection, but after receiving information of this pattern, eNB2 discovers that this patterns conflicts with a pattern used by a neighbor eNB of the present eNB during CCA detection. In this case, eNB2 will feed a piece of information, which is alternatively used to request eNB1 for re-designating a new available pattern or may be used to inform of information of a surrounding unavailable CCA pattern thereof, back to eNB1, or determine a new CCA pattern that does not conflict with the neighbor eNB of the present eNB, and then notify eNB1 of this new CCA pattern.

Second Embodiment

The present embodiment is used to illustrate parameters transferred via an X2 interface to determine a CCA pattern.

From the first embodiment, it can be seen that parameters notified via an X2 interface may be information such as a frequency domain bandwidth, a minimum resource granularity (RB or RE), a cluster quantity, the size of each cluster, a cluster initial location, a frequency domain shift relative to a frequency domain starting point, a period T and the quantity of reused nodes, and a CCA pattern of a frequency domain can be obtained according to one or more of the above-mentioned information.

It is supposed that the quantity of clusters notified via an X2 interface is 4, the size of each cluster is two Physical Resource Blocks (PRBs), and a cluster initial location is a frequency domain RB index value 0. By means of these parameters, it can be determined that frequency domain locations of CCA patterns of eNBs are [RB0,RB1], [RB6,RB7], [RB12,RB13], [RB18,RB19].

It is supposed that a cluster initial location notified via an X2 interface is a frequency domain RB index value 0, a frequency domain bandwidth is 5 MHz, the size of each cluster is 2-PRB, and an appearance period of each cluster is 6-PRB. By means of these parameters, it can be likewise determined that frequency domain locations of CCA patterns of eNBs are [RB0,RB1], [RB6,RB7], [RB12,RB13], [RB18, RB19].

Likewise, a cluster initial location notified via an X2 interface is a frequency domain RB index value 0, a frequency domain bandwidth is 5 MHz, the size of each cluster is 2-PRB, and the quantity of reused nodes is 3, so that frequency domain locations of the above-mentioned CCA detection patterns are obtained likewise.

If the quantity of clusters notified via an X2 interface is 4, the size of each cluster is 24 subcarriers and a cluster initial location is a frequency domain subcarrier index value 0, it can be determined that frequency domain subcarrier locations used by eNBs during CCA detection are [C0,C23], [C72,C95], [C144,C167], [C216,C230]. Likewise, if the cluster initial location is a frequency domain subcarrier index 0, a frequency domain bandwidth is 5 MHz, the size of each cluster is 24 subcarriers and an appearance period of each cluster is 72 subcarriers, or if the cluster initial location is a frequency domain subcarrier index 0, a frequency domain bandwidth is 5 MHz, the size of each cluster is 24 subcarriers and the quantity of reused nodes is 3, it can also be determined that frequency domain subcarrier-level patterns used by eNBs during CCA detection are [C0,C23], [C72,C95], [C144,C167], [C216,C230].

If an RB index value corresponding to a frequency domain shift of a first cluster notified via an X2 interface is 1, a frequency domain bandwidth is 5 MHz, the size of each cluster is 2-PRB and an appearance period of each cluster is 6-PRB, it can be determined, by means of these parameters, that frequency domain locations of CCA patterns of eNBs are [RB1,RB2], [RB7,RB8], [RB13,RB14], [RB19,RB20].

By adopting the above-mentioned similar method, in correspondence to frequency domain bandwidths 10 MHz, 15 MHz and 20 MHz, corresponding CCA patterns may be obtained according to one or more of the quantity of clusters, the size of each cluster, a cluster initial location, a period T, the quantity of reused nodes and the like.

Third Embodiment

The present embodiment mainly describes a scenario where an eNB or a UE performs CCA detection according to a specific CCA pattern and correspondingly transmits a resource pattern of data after detecting that a channel is vacant. Alternatively, a signal is reserved to send a pattern, correspondingly.

Figure 3:
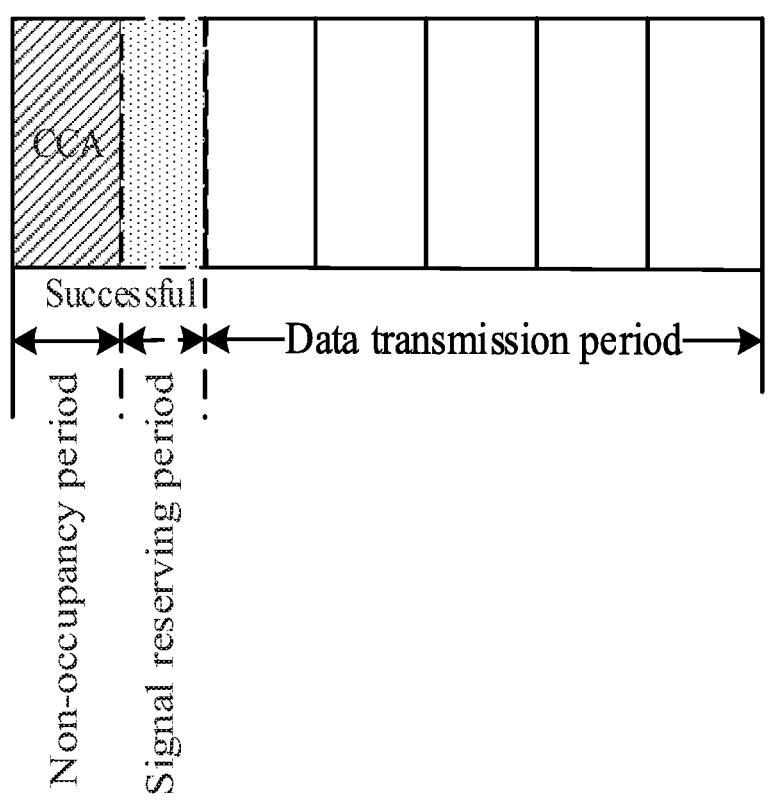
FIG. 3 illustrates a diagram of a node from CCA detection in accordance with a specific CCA pattern to transmission sending according to an embodiment of the disclosure.

As shown in FIG. 3, a signal reserving period is identified by using a dotted line. This is because a node detects that a channel vacancy time may be exactly at a boundary of one or more symbols or data transmission supports transmission of part of frames. In this case, it is probably unnecessary to send a reserved signal in a non-complete OFDM symbol. Conversely, it is necessary to send the reserved signal in the non-complete OFDM symbol to occupy a channel.

A situation where it is unnecessary to send a reserved signal may exist for an OFDM symbol at the tail of a subframe during CCA detection. Here, it is supposed that each node executes CCA detection during a non-occupancy period according to an own CCA pattern. After detecting that a channel is vacant, the node directly enters a data transmission period, and each node sends data on a corresponding data resource.

During the data transmission period, data is transmitted under the following four situations:

situation 1: a node transmits data on frequency domain resources in one-to-one correspondence to CCA detection patterns;

situation 2: a node transmits data on an entire bandwidth, but reserves frequency domain resources of CCA patterns;

situation 3: a node transmits data on an entire bandwidth, but reserves pre-set REs on frequency domain resources of CCA patterns or reserves pre-set REs on frequency domain resources, and does not send data; and situation 4: a node transmits data on an entire bandwidth.

In the presence of a signal reserving period, it is supposed that each node executes CCA detection during a non-occupancy period according to an own CCA pattern. After the node detects that a channel is vacant, the node does not transmit data immediately, but enters the signal reserving period. Under the scenario where a CCA detection success time is not at a boundary of an OFDM symbol, it is necessary to send a reserved signal in a non-complete OFDM symbol. Under the scenario where the CCA detection success time is exactly at the boundary of an OFDM symbol instead of the boundary of a subframe, it is necessary to send a reserved signal in a complete OFDM symbol so as to occupy a channel until a data transmission period comes, so the node sends data on a data resource immediately. In view of this, there are the following several situations:

situation 1: signal reserving patterns used during a signal reserving period are in one-to-one correspondence to CCA patterns during a non-occupancy period, and data sending patterns during a data transmission period are also in one-to-one correspondence to the CCA patterns during the non-occupancy period;

situation 2: signal reserving patterns used during a signal reserving period are not in one-to-one correspondence to CCA patterns during a non-occupancy period, a reserved signal may be sent on an entire bandwidth, and data sending patterns during a data transmission period are in one-to-one correspondence to the CCA patterns during the non-occupancy period;

situation 3: signal reserving patterns used during a signal reserving period are not in one-to-one correspondence to CCA patterns during a non-occupancy period, that is, reserved signals are sent at two ends of an entire frequency domain bandwidth (energy of the reserved signals on frequency domain resources at the two ends exceeds 80% of the entire bandwidth energy), and data sending patterns during a data transmission period are in one-to-one correspondence to the CCA patterns during the non-occupancy period;

situation 4: signal reserving patterns used during a signal reserving period are not in one-to-one correspondence to CCA patterns during a non-occupancy period, that is, reserved signals are sent on 80% or more of resources in the middle of an entire frequency domain bandwidth, and data sending patterns during a data transmission period are in one-to-one correspondence to the CCA patterns during the non-occupancy period;

situation 5: signal reserving patterns used during a signal reserving period are in one-to-one correspondence to CCA patterns during a non-occupancy period, and data sending patterns during a data transmission period are not in one-to-one correspondence to the CCA patterns during the non-occupancy period, that is, data is sent on an entire system bandwidth;

situation 6: signal reserving patterns used during a signal reserving period are in one-to-one correspondence to CCA patterns during a non-occupancy period, and data sending patterns during a data transmission period are not in one-to-one correspondence to the CCA patterns during the non-occupancy period, that is, data is transmitted on an entire bandwidth, but frequency domain resources corresponding to CCA patterns are reserved in subsequent subframes;

situation 7: signal reserving patterns used during a signal reserving period are not in one-to-one correspondence to CCA patterns during a non-occupancy period, a reserved signal may be sent on an entire bandwidth, and data sending patterns during a data transmission period are not in one-to-one correspondence to the CCA patterns during the non-occupancy period, that is, data is sent on an entire system bandwidth;

situation 8: signal reserving patterns used during a signal reserving period are not in one-to-one correspondence to CCA patterns during a non-occupancy period, a reserved signal may be sent on an entire bandwidth, and data sending patterns during a data transmission period are not in one-to-one correspondence to the CCA patterns during the non-occupancy period, that is, data is transmitted on an entire bandwidth, but frequency domain resources corresponding to CCA patterns are reserved in subsequent subframes;

situation 9: signal reserving patterns used during a signal reserving period are not in one-to-one correspondence to CCA patterns during a non-occupancy period, that is, reserved signals are sent at two ends of an entire frequency domain bandwidth (energy of the reserved signals on frequency domain resources at the two ends exceeds 80% of the entire bandwidth energy), and data sending patterns during a data transmission period are not in one-to-one correspondence to the CCA patterns during the non-occupancy period, that is, data is sent on an entire system bandwidth;

situation 10: signal reserving patterns used during a signal reserving period are not in one-to-one correspondence to CCA patterns during a non-occupancy period, that is, reserved signals are sent at two ends of an entire frequency domain bandwidth (energy of the reserved signals on frequency domain resources at the two ends exceeds 80% of the entire bandwidth energy), and data sending patterns during a data transmission period are not in one-to-one correspondence to the CCA patterns during the non-occupancy period, that is, data is transmitted on an entire bandwidth, but frequency domain resources corresponding to CCA patterns are reserved in subsequent subframes;

situation 11: signal reserving patterns used during a signal reserving period are not in one-to-one correspondence to CCA patterns during a non-occupancy period, that is, reserved signals are sent on 80% or more of resources in the middle of an entire frequency domain bandwidth, and data sending patterns during a data transmission period are not in one-to-one correspondence to the CCA patterns during the non-occupancy period, that is, data is sent on an entire system bandwidth; and situation 12: signal reserving patterns used during a signal reserving period are not in one-to-one correspondence to CCA patterns during a non-occupancy period, that is, reserved signals are sent on 80% or more of resources in the middle of an entire frequency domain bandwidth, and data sending patterns during a data transmission period are not in one-to-one correspondence to the CCA patterns during the non-occupancy period, that is, data is transmitted on an entire bandwidth, but frequency domain resources corresponding to CCA patterns are reserved in subsequent subframes.

The reserved signal sent during the signal reserving period may be an SRS, a preamble, a PSS/SSS or a predetermined identifier, where the SRS sent according to a signal reserving pattern not only can be used for other reused nodes to perform CCA detection and to send the SRS before uplink data transmission, but also enables an eNB to obtain channel measurement information more rapidly.

Fourth Embodiment

The present embodiment mainly describes a process that a node adopts the same CCA pattern to execute CCA detection and data transmission.

That is to say, the same CCA pattern is used during CCA detection in a non-occupancy period by at least one of eNBs or UEs in an LAA system, or at least one of eNBs or UEs of the same operator, or intra-cell UEs, where this CCA pattern may be configured by high-layer signaling or obtained according to a pre-appointment.

When at least one of eNBs or UEs in an LAA system or at least one of eNBs or UEs of the same operator or intra-cell UEs execute CCA at unaligned time, a situation where some nodes succeed in contention whilst other nodes detect that a channel is busy will occur. If the CCA detection success time of nodes which have successfully detected that a channel is vacant is not at a boundary of an OFDM symbol yet, it is necessary to send a reserved signal in a non-complete OFDM symbol, and if the CCA detection success time thereof is exactly at the boundary of the symbol but does not reach a data transmission time, it is necessary to send a reserved signal in a complete OFDM symbol. In this case, if a reserved signal is sent on an entire bandwidth, it is necessary to carry, in the reserved signal, an identifier used for identification of other reusable nodes, where the identifier may be a cell ID or an operator ID or a group ID, so as to achieve frequency multiplexing. Meanwhile, the reserved signal may also be an SRS, a preamble, a PSS/SSS or a predetermined identifier. It is important to note that the SRS sent according to a signal reserving pattern not only can be used for other reused nodes to perform CCA detection and to send the SRS before uplink data transmission, but also enables an eNB to obtain channel measurement information more rapidly. Conversely, if the reserved signal is sent according to a pattern corresponding to a CCA pattern, other reusable nodes which continuously execute CCA detection need to judge that a channel is busy on corresponding CCA pattern locations and a channel is vacant on other frequency domain resources, so it is regarded that the channel is available.

Figure 4A:
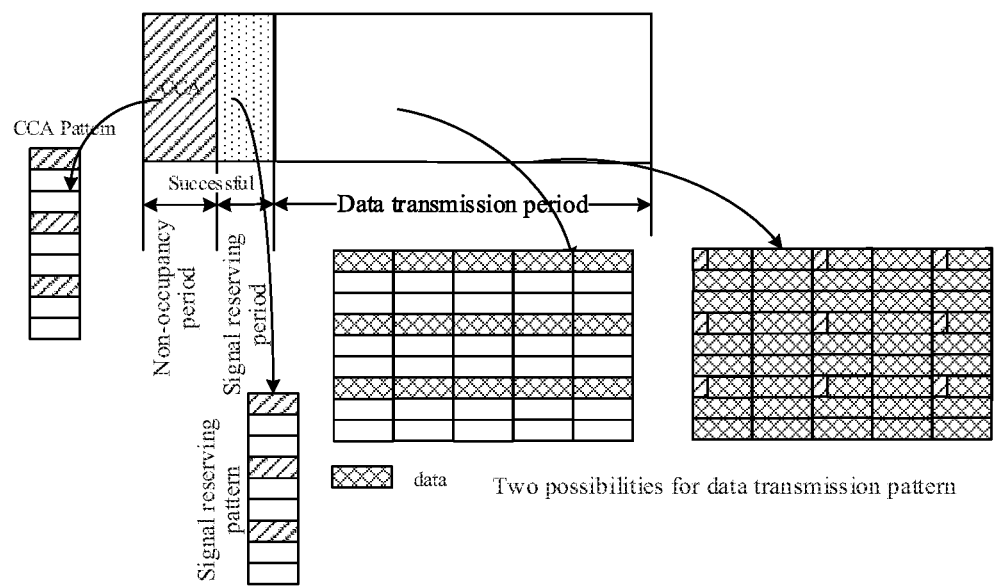
FIG. 4 (a) illustrates a diagram of a pattern used during a non-occupancy period, a reserved signal period and a data transmission period according to an embodiment of the disclosure.
Figure 4B:
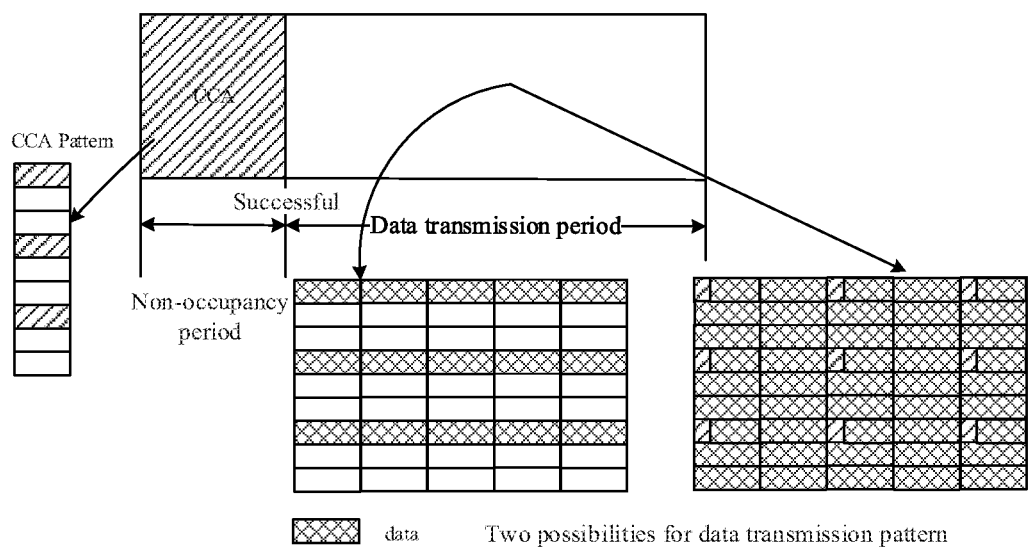

During a data transmission period, eNBs/UEs in an LAA system and eNBs/UEs in the same operator start to reuse secured resources together. In the data transmission period, reused nodes may send data on an entire bandwidth, or, transmit data on frequency domain resources corresponding to CCA detection patterns. Alternatively, data is transmitted on the entire bandwidth, and CCA detection resources are reserved at frequency domain locations in one-to-one correspondence to CCA patterns on symbol frequency domain resources in subsequent subframes during the data transmission period. As shown in FIG. 4 (a), it is convenient for a node to continuously execute CCA detection, so that the system performance can be improved.

If the CCA detection success time of nodes which have successfully detected that a channel is vacant is exactly at a boundary of a subframe, it is unnecessary to send a reserved signal, and data is transmitted directly in the data transmission period. In this case, reused nodes may send data on the entire bandwidth. However, in order to enable nodes, continuously performing CCA detection, in the same system or the same operator to reuse secured unlicensed carrier resources, data may be transmitted on frequency domain resources corresponding to CCA detection patterns during the data transmission period or data may be transmitted on the entire bandwidth, and pre-set REs on frequency domain resources in correspondence to CCA detection patterns are reserved, or pre-set frequency domain REs in the data transmission period are reserved not for transmission. Alternatively, data may be transmitted on the entire bandwidth, and frequency domain locations, in correspondence to CCA detection patterns, on symbol frequency domain resources in subsequent subframes during the data transmission period are punched for nodes to identify and reuse resources secured in the same system or the same operator together for data transmission, as shown in FIG. 4 (b).

Fifth Embodiment

The present embodiment is mainly used to introduce details for punching corresponding resources to achieve the aim of at least one of frequency division multiplexing or frequency multiplexing.

If two nodes are reused on a system bandwidth and CCA detection patterns of the two nodes are complementary in the frequency domain. An example is taken for complementation in the frequency domain. A node 1 occupies a corresponding resource of which a frequency domain resource index number is odd, a node 2 occupies a corresponding resource of which a frequency domain resource index number is even, and frequency domain resource patterns corresponding to the node 1 and the node 2 are combined to be equal to an entire bandwidth.

When it is detected that a channel is vacant and a detection success time is not at a boundary of a subframe, they may send reserved signals on frequency domain resources in correspondence to CCA detection patterns. In this case, only when nodes performing CCA detection detect that a channel is busy on own patterns whilst detecting that a channel is vacant on remaining frequency domain resources, it is regarded that nodes in the same system or the same operator occupy the channel. In this case, two reused nodes send reserved signals on the corresponding patterns, detect that a channel is busy at corresponding pattern resource locations, and detect that the channel is still busy on other resources, so they cannot determine whether nodes in the same system or the same operator occupy the channel.

Subsequent symbols during a signal reserving period are punched so as to enable other reused nodes adopting detection patterns during the signal reserving period to perform identification.

Herein, the punching mode may refer to: punching one or more first or middle or last REs of each RB of a frequency domain pattern corresponding to one or more subsequent OFDM symbols.

If the reused node 1 discovers that a channel on corresponding pattern resources and other resources is busy, it is necessary to detect, on a specific RE in a corresponding pattern, whether the channel is vacant, and if the channel is vacant, it may be determined that the channel is available. The reused node 2 may also adopt the method similar to the method adopted by the reused node 1, and reusing of nodes in the same system or the same operator is achieved by punching some REs in corresponding patterns.

During a data transmission period, in order to increase the reusing efficiency of resources, an OFDM symbol in a subsequent subframe in the data transmission period is punched for those reusable nodes, performing CCA detection, to perform pattern identification. Alternatively, corresponding frequency domain resources on one or more OFDM symbols in a subsequent subframe are punched, where punched time frequency resource locations are locations other than locations of used reference signals and channels. For example, it is necessary to avoid locations of reference signals or channels such as a DMRS, an SRS, a PDCCH, a PUCCH, a CRS, and a CSI-RS.

During the data transmission period, nodes transmit data on frequency domain resources corresponding to CCA detection patterns. In this case, other resources on a frequency domain are also occupied by other frequency division multiplexing nodes to transmit data. Thus, since detecting that a channel is busy, other nodes in the same system or the same operator cannot judge whether resources are available. So, it is necessary to punch some REs in a pattern for transmitting the data so as to achieve identification and reusing of nodes in the same system or the same operator or the same group. It is likewise necessary to avoid locations of reference signals or channels such as a DMRS, an SRS, a PDCCH, a PUCCH, a CRS, and a CSI-RS for a punched RE muting pattern.

During the data transmission period, data is transmitted on an entire bandwidth, frequency domain locations, in correspondence to CCA detection patterns, on symbol frequency domain resources in subsequent subframes during the data transmission period are punched, where the punching locations are corresponding frequency domain resource on one or more OFDM symbols in the subsequent subframes. Or, some REs on corresponding CCA detection pattern resources may be punched without the need of punching resources corresponding to the whole CCA detection pattern to achieve an identification function. This may reduce waste of resources to a certain extent.

Likewise, it is necessary to avoid locations of reference signals or channels such as a DMRS, an SRS, a PDCCH, a PUCCH, a CRS, and a CSI-RS for the punched resource locations. There are the following situations.

As for uplink data transmission, in order to avoid a PUCCH, a DMRS and an SRS, a punching location may be frequency domain locations on first three OFDM symbols of a subframe.

As for downlink data transmission, in order to avoid a PDCCH, a CRS, and a CSI-RS, resources at second and third RE locations in some RBs may be punched for reused nodes to perform pattern identification, and when it is detected that corresponding REs are vacant, it is regarded that this resource may be reused for data transmission.

Sixth Embodiment

The present embodiment mainly illustrates a process that different cells or different operators use different CCA patterns to perform CCA detection and data transmission.

In the present embodiment, different cells or different operator networks may be notified of corresponding CCA patterns via high-layer signaling, or the method for obtaining CCA patterns by exchange between eNBs, introduced in the first embodiment, may also be adopted, where CCA patterns of UEs may also be acquired in an eNB notification manner.

It is supposed that different cells or different operators know pattern information during respective execution of CCA detection, that is to say, nodes in the same cell or the same operator network use the same CCA pattern to perform CCA detection, and different cells or different operator networks use different CCA patterns to perform CCA detection.

The manner that nodes in the same cell or the same operator network use the same CCA pattern to perform CCA detection and reuse secured resources to perform data transmission is identical to the manner in the fourth embodiment.

Here, it is necessary to describe the situation that different cells or different operator networks use different CCA patterns to perform CCA detection.

It is supposed that there are three cells namely Cell1, Cell2 and Cell3, and a CCA pattern used by each cell or a UE in the cell during CCA detection is an RB resource index number corresponding to a system bandwidth or a result obtained by modulus between a subcarrier resource index number and a cell number, where a resource corresponding to an RB or subcarrier index number of which the result is 0 is regarded as a pattern used by Cell1 or a UE in Cell1 during CCA detection, and patterns corresponding to resource indexes of which the results are 1 and 2 are patterns used by Cell2 and Cell3 during CCA detection respectively, or, are CCA patterns used by UEs in Cell2 and Cell3 during CCA detection.

During a non-occupancy period, Cell1, Cell2 and Cell3 or UEs in the three cells perform CCA detection according to respective CCA patterns respectively. According to whether the cells are synchronized, it is illustrated as follows.

If the cells are synchronized, once it is detected that a channel is vacant, when a data transmission period comes, the cells or the UEs in the cells may transmit data together, so as to achieve frequency multiplexing.

If the cells are non-synchronized, nodes, detecting that a channel is vacant, either send reserved signals or directly send data. If sending reserved signals, the nodes, detecting that the channel is vacant, need to send signal reserving patterns in one-to-one correspondence to CCA patterns or need to send reserved signals on an entire bandwidth, but frequency domain resources in one-to-one correspondence to CCA patterns are reserved, thereby making it convenient for other nodes continuously performing CCA detection in the cells to identify reserved signals sent by the same cell other UEs in the same cell. Here, the sent reserved signals may be SRSs, which may assist an eNB in obtaining channel information as soon as possible and may allow other reused nodes to perform pattern identification.

Herein, when the cells are non-synchronized, judging whether a channel is available during a signal reserving period is implemented in the following manners:

manner 1: in case of sending a reserved signal on frequency domain resources in one-to-one correspondence to CCA detection patterns, if it is detected that a channel is busy on a resource of a CCA frequency domain pattern and it is detected that the channel is vacant on other frequency domain resources, it is regarded that the channel is available;

manner 2: in case of sending a reserved signal on frequency domain resources in one-to-one correspondence to CCA detection patterns, a system bandwidth is utilized by multiple nodes to send a reserved signal in a frequency division multiplexing manner, and the nodes detect that a channel is busy on corresponding resources of CCA frequency domain patterns and detect that the channel is also busy on other frequency domain resources, so the nodes need to continue detecting whether the channel is vacant on pre-set REs of the CCA frequency domain patterns, and it is regarded that the channel is available when it is detected that the channel is vacant; and manner 3: in case of sending a reserved signal on an entire bandwidth and reserving frequency domain resources in one-to-one correspondence to CCA detection patterns, if it is detected that a channel is vacant on corresponding resources of CCA frequency domain patterns and it is detected that the channel is busy on other frequency domain resources, it is regarded that the channel is available.

Herein, in case of continuing detecting whether it is vacant on pre-set REs, during a data sending period, CCA detection marks are added to some symbols on data sending resources, and used to prompt nodes which miss a CCA detection opportunity during at least one of the non-occupancy period or the signal reserving period to identify CCA patterns again, thereby ensuring that unlicensed carrier resources are reused together during the data sending period to transmit data.

Herein, the manner of adding CCA detection marks is as follows.

Frequency domain resources consistent with CCA patterns are punched; or, frequency domain resources consistent with signal reserving patterns are punched; or, some REs in corresponding patterns are punched; or, specific RE resources on a certain symbol in a subframe in a data transmission resource are punched.

By means of the above-mentioned method, different cells or different operators or nodes under different cells adopt different CCA patterns, signal reserving patterns and the like during a CCA detection period, a signal reserving period and a data transmission period to improve the performance of the whole system. Meanwhile, different cells use different frequency domain location resources to reduce inter-cell interference, thereby not only realizing inter-cell resource frequency division multiplexing, but also realizing intra-cell frequency multiplexing.

Seventh Embodiment

The present embodiment mainly illustrates a process that different UEs or different UE groups adopt different CCA patterns to execute CCA detection and data transmission.

The present embodiment is mainly directed to uplink data transmission. If different UEs or different UE groups adopt different CCA patterns, each UE/UE group acquires a respective CCA pattern, where the CCA pattern may be obtained by direct notification via high-layer signaling, or obtained by notification via a corresponding eNB, or pre-appointed.

The method for executing CCA detection and data sending is similar to the method in the sixth embodiment. In short, CCA patterns adopted by different UEs or different UE groups during CCA detection may be two edges in pre-scheduled resources or equal-interval RB or subcarrier resources.

If different UEs detect that a channel is vacant on respective CCA patterns, different UEs may send SRSs immediately on secured resources, the SRSs being used to notify that an eNB has successfully occupied the unlicensed carrier, and to request for channel measurement. Likewise, the SRSs may be sent together with data. Different UEs adopt different CCA patterns, so that inter-UE frequency division multiplexing can be well realized, thereby improving the frequency diversity gain, and improving the uplink throughput.

Similar to the sixth embodiment, different UE groups adopt different CCA patterns, so that not only inter-group frequency multiplexing is realized, but also inter-group frequency division multiplexing can be realized, thereby greatly increasing the utilization rate of an uplink frequency domain.

After CCA detection is successful, each UE or UE group may send a respective SRS (the SRS may be sent as a reserved signal or may be sent together with data, and an SRS sending pattern may be consistent or inconsistent with a CCA detection pattern), used for an eNB to perform channel estimation, so as to issue an appropriate Modulation and Coding Scheme (MCS), thereby improving the uplink transmission quality.

Eighth Embodiment

A CCA pattern may be a frequency domain pattern determined according to one or more of information such as a frequency domain initial location, a frequency domain shift, a resource successive length/cluster size, a period T (the period may be determined by multiplying the quantity of reused nodes by the quantity of successively occupied resources), a frequency domain bandwidth or a cluster quantity.

A process of acquiring a CCA detection pattern is illustrated below with an alternative embodiment, and implemented by using, not limited to, the following method.

The process is as follows.

$$k=(v+fv_{shift}) \bmod N_{resource}$$

$$v=0,1,\ldots f-1, v_{shift}=N_{ID}^{Cell} \bmod N$$

where k denotes a frequency domain initial location, f denotes a number of resources successively occupied by a node, $v_{shift}$ denotes a frequency domain shift, N denotes a total number of reused nodes, $N_{resource}$ denotes a total number of resources, $N_{ID}^{Cell}$ denotes an ID of a cell, and N denotes a number of reused nodes, where the period T is obtained by multiplying the quantity of reused nodes by the quantity of successively occupied resources, a shift is acquired according to an ID of a reused cell, and an initial frequency domain location of this cell is determined according to the shift.

As for an RB-level CCA pattern:

in the present embodiment, an RB-level CCA pattern may be determined under the conditions that a resource successive length f is 2 RBs, the quantity N of reused eNBs is 3 (period T=3*2=6), system bandwidth=25 RBs, cell IDs are 195, 196 and 197 respectively and a frequency domain shift may be determined by means of modulus between a cell ID and the quantity of reused nodes. An example is as follows.

As for a first node (eNB), v=0, 1. $v_{shift}=N_{ID}^{Cell}$ mod N=195 mod 3=0, so a frequency domain resource initial location of the first node is: if v=0, k=(v+fv$_{shift}$)mod $N_{resource}$=(0+2*0)mod 25=0, and if v=1, k=(v+fv$_{shift}$)mod $N_{resource}$=(1+2*0)mod 25=1, so an initial location of the first node on a frequency domain is resources of which RB resource index numbers are 0 and 1, and from period T=6, it can be seen that a frequency domain RB pattern position of the first node is: [RB0,RB1], [RB6,RB7], [RB12,RB13], [RB18,RB19], [RB24]. Likewise, as for a second node, due to different cell IDs, $v_{shift}$ is different. As for the second node, v=0, 1. $v_{shift}=N_{ID}^{Cell}$ mod N=196 mod 3=1, so a frequency domain resource initial location of the first node is: if v=0, k=(v+fv$_{shift}$)mod $N_{resource}$=(0+2*1)mod 25=2, and if v=1, k=(v+fv$_{shift}$)mod $N_{resource}$=(1+2*1)mod 25=3, so an initial location of the second node on a frequency domain is resources of which RB resource index numbers are 2 and 3, and from period T=6, it can be seen that a frequency domain RB pattern position of the first node is: [RB2,RB3], [RB8, RB9], [RB14,RB15], [RB20,RB21]. A process of calculating an RB pattern of a third node is similar, and will not be repeated herein.

As for a subcarrier-level CCA pattern:

a subcarrier-level CCA pattern in an RB is only described here, that is because subcarrier patterns in other RBs are the same.

In the present embodiment, a subcarrier-level CCA pattern may be determined under the conditions that a resource successive length f is 2 subcarriers, the quantity N of reused eNBs is 3 (period T=3*2=6), system bandwidth=300 subcarriers (there are 12 subcarriers in an RB), cell IDs are 195, 196 and 197 respectively and a frequency domain shift may be determined by means of modulus between a cell ID and the quantity of reused nodes. The situation is as follows.

As for a first node (eNB), v=0, 1. $v_{shift}=N_{ID}^{Cell}$ mod N=195 mod 3=0, so a frequency domain resource initial location of the first node is: if v=0, k=(v+fv$_{shift}$)mod $N_{resource}$=(0+2*0)mod 300=0, and if v=1, k=(v+fv$_{shift}$)mod $N_{resource}$=(1+2*0)mod 300=1, so an initial location of the first node on a frequency domain in an RB is resources of which subcarrier resource index numbers in an RB are 0 and 1, and from period T=6, it can be seen that a frequency domain subcarrier-level pattern position of the first node in an RB is: [CO$_3$C1], [C6,C7]. Likewise, as for a second node, due to different cell IDs, $v_{shift}$ is different. As for the second node, v=0, 1. $v_{shift}=N_{ID}^{Cell}$ mod N=196 mod 3=1, so a frequency domain resource initial location of the second node in an RB is: if v=0, k=(v+fv$_{shift}$)mod $N_{resource}$=(0+2*1)mod 300=2, and if v=1, k=(v+fv$_{shift}$)mod $N_{resource}$=(1+2*1)mod 300=3, so an initial location of the second node on a frequency domain in an RB is resources of which subcarrier resource index numbers in an RB are 2 and 3, and from period T=6, it can be seen that a frequency domain subcarrier-level pattern position of the second node in an RB is: [C2,C3], [C8,C9]. A process of calculating an RB pattern of a third node is similar, and will not be repeated herein.

The embodiment of the disclosure provides a device for managing a pattern on an unlicensed carrier, applied to a transmission node. The transmission node includes one or more of the following: system-level nodes, cell-level nodes and UE-level nodes. The device includes:

a management module, configured to generate and exchange CCA patterns, the CCA patterns including: patterns used in different stages of CCA detection, a pattern used during data transmission, and a CCA detection pattern.

That is, the management module is in charge of generation and exchange of patterns used in different stages of CCA detection, a pattern used for data transmission and a CCA detection pattern.

The management module may include:

a generation module, configured to generate a CCA pattern, the CCA pattern including: patterns used in different stages of CCA detection, a pattern used for data transmission, and a CCA detection pattern; and an exchange module, configured to exchange a CCA pattern, the CCA pattern including: patterns used in different stages of CCA detection, a pattern used for data transmission, and a CCA detection pattern.

Alternatively, the different stages of CCA detection include at least one of the following stages:

a non-occupancy period;

a signal reserving period; and a data transmission period.

Alternatively, a pattern used for CCA detection during the non-occupancy period includes one of the following:

a CCA detection pattern having equal intervals in the frequency domain and adopting an RB as a minimum resource granularity;

a CCA detection pattern having unequal intervals in the frequency domain and adopting an RB as a minimum resource granularity;

a CCA detection pattern having equal intervals in the frequency domain and adopting an RE as a minimum resource granularity;

a CCA detection pattern having unequal intervals in the frequency domain and adopting an RE as a minimum resource granularity;

a sub-band-level CCA detection pattern having equal intervals in the frequency domain; or a sub-band-level CCA detection pattern having unequal intervals in the frequency domain.

Alternatively, a pattern used for CCA detection during the signal reserving period includes one of the following:

if a reserved signal is sent on an entire bandwidth, there is no CCA detection pattern;

if a reserved signal is sent on an entire bandwidth, frequency domain resources in one-to-one correspondence to CCA detection patterns are reserved for CCA pattern detection performed by reused nodes during the signal reserving period; and if a reserved signal is sent in frequency domain resources in one-to-one correspondence to CCA detection patterns, a pattern for sending the reserved signal is taken as a pattern used for CCA pattern detection performed by reused nodes during the signal reserving period.

Alternatively, the reserved signal sent during the signal reserving period may include one of the following:

an SRS, a preamble, a PSS/SSS or a predetermined identifier.

Alternatively, when an SRS is taken as a reserved signal of a reserved signaling device, the SRS is sent before uplink data is sent.

Alternatively, it is determined that the reused nodes perform CCA detection successfully during the signal reserving period in accordance with one of the following manners:

manner 1: in case of sending a reserved signal on frequency domain resources in one-to-one correspondence to CCA detection patterns, if it is detected that a channel is busy on a resource of a CCA frequency domain pattern and it is detected that the channel is vacant on other frequency domain resources, it is regarded that the channel is available;

manner 2: in case of sending a reserved signal on frequency domain resources in one-to-one correspondence to CCA detection patterns, a system bandwidth is utilized by multiple nodes to send a reserved signal in a frequency division multiplexing manner, and the nodes detect that a channel is busy on corresponding resources of CCA frequency domain patterns and detect that the channel is also busy on other frequency domain resources, so the nodes detect whether the channel is vacant on pre-set REs of the CCA frequency domain patterns, and it is regarded that the channel is available when it is detected the channel is vacant; and manner 3: in case of sending a reserved signal on an entire bandwidth and reserving frequency domain resources in one-to-one correspondence to CCA detection patterns, if it is detected that a channel is vacant on corresponding resources of CCA frequency domain patterns and it is detected that the channel is busy on other frequency domain resources, it is regarded that the channel is available.

Alternatively, a pattern used for CCA detection during the data transmission period includes one of the following:

if data is transmitted on an entire bandwidth, there is no CCA detection pattern;

if data is transmitted on an entire bandwidth, frequency domain resources in one-to-one correspondence to CCA detection patterns are reserved for CCA pattern detection performed by reused nodes during the data transmission period;

if data is transmitted on an entire bandwidth, pre-set REs on frequency domain resources in one-to-one correspondence to CCA detection patterns are reserved, or pre-set frequency domain REs within the data transmission period are reserved, for CCA pattern detection performed by reused nodes during the data transmission period; and if data is transmitted in frequency domain resources in one-to-one correspondence to CCA detection patterns, a pattern for transmitting the data is taken as a pattern used for CCA pattern detection performed by reused nodes during the signal reserving period.

Alternatively, it is determined that the reused nodes perform CCA detection successfully during the data transmission period in accordance with one of the following manners:

manner 1: when data is transmitted on an entire system bandwidth and frequency domain resources in one-to-one correspondence to CCA detection patterns are reserved, if it is detected that a channel is vacant on corresponding reserved resources of CCA frequency domain patterns and it is detected that the channel is busy on other frequency domain resources, it is determined that the channel is available;

manner 2: when data is transmitted on an entire system bandwidth in a frequency division multiplexing manner, it is detected that a channel is busy on corresponding data transmission resources of CCA frequency domain patterns and it is detected that the channel is also busy on other frequency domain resources, so nodes detect whether the channel is vacant on reserved vacant REs on data transmission resources corresponding to the CCA frequency domain patterns, and it is regarded that the channel is available when it is detected that the channel is vacant; and manner 3: when data is transmitted on an entire bandwidth and pre-set REs on frequency domain resources are punched for channel availability determination performed by reused nodes during the data transmission period, if it is detected that the channel is busy on corresponding resources of CCA frequency domain patterns and it is detected that the channel is also busy on other frequency domain resources, it is continuously detected whether the channel is vacant on reserved REs of the CCA frequency domain patterns or reserved REs on the frequency domain resources, and it is regarded that the channel is available when it is detected that the channel is vacant.

Alternatively, the pattern used for data transmission includes:

data is transmitted on an entire system bandwidth;

data is transmitted on an entire system bandwidth, and frequency domain resources in one-to-one correspondence to CCA detection patterns are reserved and not used for data transmission;

data is transmitted on an entire system bandwidth, and pre-set RE resources in frequency domain resources in one-to-one correspondence to CCA detection patterns are reserved and not used for data transmission; and data is transmitted on frequency domain resources in one-to-one correspondence to CCA detection patterns.

Alternatively, locations of the CCA detection patterns used for data transmission are locations of frequency domain resources on one or more symbols in a subsequent subframe, where the frequency domain resources are resources in one-to-one correspondence to frequency domain locations of the CCA detection patterns, or are RE resources in frequency domain resources corresponding to the CCA detection patterns, or pre-set RE resources on the frequency domain.

Alternatively, the one or more symbols in the subsequent subframe is/are a first symbol or first several symbols in the subframe; and, a location of an OFDM symbol or a punching location of an RE of a frequency domain resource corresponding to the symbol is a location other than locations of used reference signals and channels.

Alternatively, the used reference signals and channels include one or more of the following: a DMRS, an SRS, a PDCCH, a PUCCH, a CRS, and a CSI-RS.

Alternatively, the system-level nodes include one or more of the following types: all nodes in an LAA system, or all nodes in an operator network, where the system-level nodes perform CCA detection by using a same CCA pattern.

The cell-level nodes include one or more of the following types: intra-cell nodes, nodes between different cells, and nodes in different cells, where the intra-cell nodes perform CCA detection by using a unified CCA pattern, and the nodes between different cells or the nodes in different cells perform CCA detection by using different CCA patterns.

The UE-level nodes include one or more of the following types: different UEs, different UE groups, or UEs in the same UE group, where different UEs or different UE groups perform CCA detection by using different CCA patterns, and the UEs in the same UE group perform CCA detection by using the same CCA pattern.

Alternatively, the action that the system-level nodes perform CCA detection by using a same CCA pattern includes one of the following:

the system-level nodes perform CCA detection by using a same RE-level CCA pattern;

the system-level nodes perform CCA detection by using a same RB-level CCA pattern; and the system-level nodes perform CCA detection by using the same sub-band-level CCA pattern.

Alternatively, when the system-level nodes include all nodes in the operator network, the action that the system-level nodes perform CCA detection by using a same CCA pattern includes one of the following:

all nodes in the operator network perform CCA detection by using a same RE-level CCA pattern;

all nodes in the operator network perform CCA detection by using a same RB-level CCA pattern; and all nodes in the operator network perform CCA detection by using a same sub-band-level CCA pattern.

Alternatively, the action that the intra-cell nodes perform CCA detection by using the same CCA pattern includes one of the following:

the intra-cell nodes perform CCA detection by using a same RE-level CCA pattern;

the intra-cell nodes perform CCA detection by using a same RB-level CCA pattern; and the intra-cell nodes perform CCA detection by using a same sub-band-level CCA pattern.

Alternatively, the action that the nodes between different cells or the nodes in different cells perform CCA detection by using different CCA patterns includes one of the following:

the nodes between different cells or the nodes in different cells perform CCA detection on respective resources by using different RE-level CCA patterns;

the nodes between different cells or the nodes in different cells perform CCA detection on respective resources by using different RB-level CCA patterns; and the nodes between different cells or the nodes in different cells perform CCA detection on respective resources by using different sub-band-level CCA patterns.

Alternatively, the action that the UEs in the UE group perform CCA detection by using the same CCA pattern includes one of the following:

the UEs in the UE group perform CCA detection by using a same RE-level CCA pattern;

the UEs in the UE group perform CCA detection by using a same RB-level CCA pattern; and the UEs in the UE group perform CCA detection by using a same sub-band-level CCA pattern.

Alternatively, the action that different UEs or different UE groups perform CCA detection by using different CCA patterns includes one of the following:

different UEs or different UE groups perform CCA detection on respective resources by using different RE-level CCA patterns;

different UEs or different UE groups perform CCA detection on respective resources by using different RB-level CCA patterns; and different UEs or different UE groups perform CCA detection on respective resources by using different sub-band-level CCA patterns.

Alternatively, CCA patterns used by the system-level nodes or the cell-level nodes or the UE-level nodes are appointed, or obtained by high-layer signaling notification.

Alternatively, when the management module is applied to an eNB, the management module exchanges the CCA patterns in the following three manners:

manner 1: information of CCA patterns of corresponding eNBs in which the management modules are located between the management modules via an X2 interface; after receiving information of a CCA pattern of an eNB, each of the management modules of adjacent eNBs of the eNB initiates a random backoff counter; and one of the management modules of which a random backoff value is first reduced to 0 performs frequency shift for a fixed value on the basis of the received CCA pattern, maintains a CCA pattern list, notifies management modules of eNBs adjacent to the eNB of which a random backoff values is first reduced, of the CCA pattern list, and stops an information exchange operation until the list has a predefined number of reusable nodes (which may be the specified number of reusable nodes in the related art);

manner 2: a management module of an eNB notifies, via an X2 interface, management module of adjacent eNBs of the eNB of a CCA pattern used during CCA detection, and after receiving information of the CCA patterns, each of the management modules of the adjacent eNBs adopts pattern frequency domain location information contained in the received information of the CCA pattern during the non-occupancy period, the signal reserving period and the data transmission period of the channel; and manner 3: a management module of an eNB notifies, via an X2 interface, management modules of adjacent eNBs of the eNB of information of a CCA pattern, and after receiving the information of CCA pattern, each of the management modules of the adjacent eNBs sends feedback information for the CCA pattern.

Alternatively, in manner 1, if random backoff values of management modules of multiple eNBs are reduced to 0 at the same time, any one of the following operations is executed:

each of the management modules of the multiple eNBs generates a random number, and determines a shift of a CCA pattern of the management module according to a magnitude of the random number;

a random backoff mechanism is re-executed; and a main eNB is selected, and CCA patterns allocated to remaining eNBs by the management module of the main eNB are received.

Alternatively, when the management module is applied to a UE, the action that the management module exchanges the CCA patterns includes the operations as follows.

CCA patterns for CCA detection, broadcast by an eNB, are received; or, high-layer signaling is received, where the high-layer signaling include the CCA patterns for CCA detection performed by the UE.

Alternatively, the CCA patterns are determined by one or more of a frequency domain initial location, a frequency domain shift, a resource successive length, a cluster size, a period T, a frequency domain bandwidth or a cluster quantity.

Alternatively, a frequency domain initial location of a node is calculated as follows:

$$k=(v+fv_{shift}) \bmod N_{resource}$$

$$v=0,1,\ldots,f-1, v_{shift}=N_{ID}^{Cell} \bmod N$$

where k denotes the frequency domain initial location, f denotes a number of resources successively occupied by the node, $V_{shift}$ denotes a frequency domain shift, N denotes a total number of reused nodes, $N_{resource}$ denotes a total number of resources, and $N_{ID}^{Cell}$ denotes an ID of a cell.

The device provided in the embodiment of the disclosure can increase the frequency multiplexing and frequency division multiplexing frequency of an eNB/eNB group or a UE/UE group on an unlicensed carrier, and reduce the complexity of identification of available resources via reused nodes in the same operator or the same cell. In addition, interference between neighbor nodes can be reduced, thereby improving the system performance to a certain extent.

The embodiment of the disclosure also provides a computer-readable storage medium which stores a computer-executable instruction. The computer-executable instruction is used to execute the method in the above-mentioned embodiment.

Those of ordinary skill in the art may understand that all or some of the steps in the above-mentioned embodiment may be implemented by using a computer program flow. The computer program may be stored in a computer-readable storage medium. The computer program is executed on a corresponding hardware platform (such as system, equipment, device and apparatus). During execution, the computer program includes one of the steps of the method embodiment or a combination thereof.

Alternatively, all or some of the steps in the above-mentioned embodiment may also be implemented by using an integrated circuit. These steps may be manufactured into integrated circuit modules respectively, or multiple modules or steps therein are manufactured into a single integrated circuit module. Thus, the embodiments of the disclosure are not limited to combination of any specific hardware and software.

The device/function module/function unit in the above-mentioned embodiment may be implemented by using a general computation device. They may be centralized on a single computation device or may be distributed on a network composed of multiple computation devices.

When being implemented in a form of software function module and sold or used as an independent product, the device/function module/function unit in the above-mentioned embodiment may be stored in a computer-readable storage medium. The above-mentioned computer-readable storage medium may be a read-only memory, a magnetic disk or an optical disk.

INDUSTRIAL APPLICABILITY

The embodiments of the disclosure can increase the frequency multiplexing and frequency division multiplexing frequency of an eNB/eNB group or a UE/UE group on an unlicensed carrier, and reduce the complexity of identification of available resources via reused nodes in the same operator or the same cell. In addition, interference between neighbor nodes can be reduced, thereby improving the system performance to a certain extent.

The invention claimed is:

1. A method for managing patterns on an unlicensed carrier, the method comprising at least one of the following actions:

performing, by transmission nodes, at least one of the following actions: performing Clear Channel Assessment (CCA) detection during different stages of the CCA detection according to CCA patterns of the stages, or transmitting at least one of a signal or data according to patterns of the stages; or exchanging the CCA patterns between the transmission nodes;

wherein the transmission nodes comprising one or more of the following types: system-level nodes, cell-level nodes or User Equipment (UE)-level nodes;

wherein the stages of CCA detection comprise at least one of the following stages: a non-occupancy period; a signal reserving period; or a data transmission period; and wherein a pattern used for CCA detection during the non-occupancy period comprises one of the following:
  a CCA detection pattern having equal intervals in the frequency domain and adopting a Resource Block (RB) as a minimum resource granularity;
  a CCA detection pattern having unequal intervals in the frequency domain and adopting an RB as a minimum resource granularity;
  a CCA detection pattern having equal intervals in the frequency domain and adopting a Resource Element (RE) as a minimum resource granularity;
  a CCA detection pattern having unequal intervals in the frequency domain and adopting an RE as a minimum resource granularity;
  a sub-band-level CCA detection pattern having equal intervals in the frequency domain; or
  a sub-band-level CCA detection pattern having unequal intervals in the frequency domain; or
wherein a pattern used for CCA detection during the signal reserving period comprises one of the following:
  if a reserved signal is sent on an entire bandwidth, there is no CCA detection pattern;
  if a reserved signal is sent on an entire bandwidth, frequency domain resources in one-to-one correspondence to CCA detection patterns are reserved for CCA pattern detection performed by reused nodes during the signal reserving period; or
  if a reserved signal is sent in frequency domain resources in one-to-one correspondence to CCA detection patterns, a pattern for sending the reserved signal is taken as a pattern used for CCA pattern detection performed by reused nodes during the signal reserving period; or
wherein a pattern used for CCA detection during the data transmission period comprises one of the following:
  if data is transmitted on an entire bandwidth, there is no CCA detection pattern;
  if data is transmitted on an entire bandwidth, frequency domain resources in one-to-one correspondence to CCA detection patterns are reserved for CCA pattern detection performed by reused nodes during the data transmission period;
  if data is transmitted on an entire bandwidth, pre-set REs on frequency domain resources in one-to-one correspondence to CCA detection patterns are reserved, or pre-set frequency domain REs within the data transmission period are reserved, for CCA pattern detection performed by reused nodes during the data transmission period; or
  if data is transmitted in frequency domain resources in one-to-one correspondence to CCA detection patterns, a pattern for transmitting the data is taken as a pattern used for CCA pattern detection performed by reused nodes during the signal reserving period.

2. The method according to claim 1, wherein the reserved signal sent during the signal reserving period comprises one of the following:
  a Sounding Reference Signal (SRS), a preamble, a Primary/Secondary Synchronization Sequence (PSS/SSS) or a predetermined identifier.

3. The method according to claim 2, wherein when an SRS is taken as a reserved signal of a reserved signaling device, the SRS is sent before uplink data is sent.

4. The method according to claim 1, wherein it is determined that the reused nodes perform CCA detection successfully during the signal reserving period in accordance with one of the following manners:

manner 1: in case of sending a reserved signal on frequency domain resources in one-to-one correspondence to CCA detection patterns, if it is detected that a channel is busy on a resource of a CCA frequency domain pattern and it is detected that the channel is vacant on other frequency domain resources, it is regarded that the channel is available;
  manner 2: in case of sending a reserved signal on frequency domain resources in one-to-one correspondence to CCA detection patterns, a system bandwidth is utilized by a plurality of nodes to send a reserved signal in a frequency division multiplexing manner, and the nodes detect that a channel is busy on corresponding resources of CCA frequency domain patterns and detect that the channel is also busy on other frequency domain resources, then the nodes detect whether the channel is vacant on pre-set REs of the CCA frequency domain patterns, and it is regarded that the channel is available when it is detected that the channel is vacant; or
  manner 3: in case of sending a reserved signal on an entire bandwidth and reserving frequency domain resources in one-to-one correspondence to CCA detection patterns, if it is detected that a channel is vacant on corresponding resources of CCA frequency domain patterns and it is detected that the channel is busy on other frequency domain resources, it is regarded that the channel is available.

5. The method according to claim 1, wherein it is determined that the reused nodes perform CCA detection successfully during the data transmission period in accordance with one of the following manners:
  manner 1: when data is transmitted on an entire system bandwidth and frequency domain resources in one-to-one correspondence to CCA detection patterns are reserved, if it is detected that a channel is vacant on corresponding reserved resources of CCA frequency domain patterns and it is detected that the channel is busy on other frequency domain resources, it is determined that the channel is available;
  manner 2: when data is transmitted on an entire system bandwidth in a frequency division multiplexing manner, it is detected that a channel is busy on corresponding data transmission resources of CCA frequency domain patterns and it is detected that the channel is also busy on other frequency domain resources, then the nodes detect whether the channel is vacant on reserved vacant REs on the data transmission resources corresponding to the CCA frequency domain patterns, and it is regarded that the channel is available when it is detected that the channel is vacant; or
  manner 3: when data is transmitted on an entire bandwidth and pre-set REs on frequency domain resources are punched for channel availability determination performed by reused nodes during the data transmission period, if it is detected that a channel is busy on corresponding resources of CCA frequency domain patterns and it is detected that the channel is also busy on other frequency domain resources, then it is continuously detected whether the channel is vacant on reserved REs of the CCA frequency domain patterns or reserved REs on the frequency domain resources, and it is regarded that the channel is available when it is detected that the channel is vacant.

6. The method according to claim 1, wherein the pattern used for data transmission comprises:

data is transmitted on an entire system bandwidth;
data is transmitted on an entire system bandwidth, and frequency domain resources in one-to-one correspondence to CCA detection patterns are reserved and not used for data transmission;
data is transmitted on an entire system bandwidth, and pre-set RE resources in frequency domain resources in one-to-one correspondence to CCA detection patterns are reserved and not used for data transmission; and
data is transmitted on frequency domain resources in one-to-one correspondence to CCA detection patterns.

7. The method according to claim 6, wherein locations of the CCA detection patterns used for data transmission are locations of frequency domain resources on one or more symbols in a subsequent subframe, wherein the frequency domain resources are resources in one-to-one correspondence to frequency domain locations of the CCA detection patterns, or are RE resources in frequency domain resources corresponding to the CCA detection patterns, or pre-set RE resources on the frequency domain.

8. The method according to claim 7, wherein the one or more symbols in the subsequent subframe is/are a first symbol or first several symbols in the subframe; and, a location of an Orthogonal Frequency Division Multiplexing (OFDM) symbol or a punching location of an RE of a frequency domain resource corresponding to the symbol is a location other than locations of used reference signals and channels.

9. The method according to claim 8, wherein the used reference signals and channels comprise one or more of the following: a Demodulation Reference Signal (DMRS), an SRS, a Physical Downlink Control Channel (PDCCH), a Physical Uplink Control Channel (PUCCH), a Cell Reference Signal (CRS), or a Channel State Information Reference Signal (CSI-RS).

10. The method according to claim 1, wherein the system-level nodes comprise one or more of the following types:
all nodes in a Licensed Assisted Access (LAA) system, or all nodes in an operator network, wherein the system-level nodes perform CCA detection by using a same CCA pattern;
wherein performing, by the system-level nodes, CCA detection by using the same CCA pattern comprises at least one of the following:
performing, by the system-level nodes, CCA detection by using a same RE-level CCA pattern;
performing, by the system-level nodes, CCA detection by using a same RB-level CCA pattern; or
performing, by the system-level nodes, CCA detection by using a same sub-band-level CCA pattern; and/or
wherein performing, by all nodes in the operator network, CCA detection by using a same CCA pattern comprises one of the following:
performing, by all nodes in the operator network, CCA detection by using a same RE-level CCA pattern;
performing, by all nodes in the operator network, CCA detection by using a same RB-level CCA pattern; or
performing, by all nodes in the operator network, CCA detection by using a same sub-band-level CCA pattern;
wherein the cell-level nodes comprise one or more of the following types: intra-cell nodes, nodes between different cells, or nodes in different cells;
wherein the intra-cell nodes perform CCA detection by using a unified CCA pattern;
wherein performing, by the intra-cell nodes, CCA detection by using the same CCA pattern comprises one of the following:
performing, by the intra-cell nodes, CCA detection by using a same RE-level CCA pattern;
performing, by the intra-cell nodes, CCA detection by using a same RB-level CCA pattern; or
performing, by the intra-cell nodes, CCA detection by using a same sub-band-level CCA pattern; and/or
the nodes between different cells or the nodes in different cells perform CCA detection by using different CCA patterns;
wherein performing, by the nodes between different cells or the nodes in different cells, CCA detection by using different CCA patterns comprises one of the following:
performing, by the nodes between different cells or the nodes in different cells, CCA detection on respective resources by using different RE-level CCA patterns;
performing, by the nodes between different cells or the nodes in different cells, CCA detection on respective resources by using different RB-level CCA patterns; or
performing, by the nodes between different cells or the nodes in different cells, CCA detection on respective resources by using different sub-band-level CCA patterns; or
the UE-level nodes comprise one or more of the following types: different UEs, different UE groups, or UEs in the same UE group;
wherein different UEs or different UE groups perform CCA detection by using different CCA patterns;
wherein performing, by different UEs or different UE groups, CCA detection by using different CCA patterns comprises one of the following:
performing, by different UEs or different UE groups, CCA detection on respective resources by using different RE-level CCA patterns;
performing, by different UEs or different UE groups, CCA detection on respective resources by using different RB-level CCA patterns; or
performing, by different UEs or different UE groups, CCA detection on respective resources by using different sub-band-level CCA patterns and/or the UEs in the same UE group perform CCA detection by using a same CCA pattern; and
wherein performing, by the UEs in the UE group, CCA detection by using the same CCA pattern comprises one of the following:
performing, by the UEs in the UE group, CCA detection by using the same RE-level CCA pattern;
performing, by the UEs in the UE group, CCA detection by using the same RB-level CCA pattern; or
performing, by the UEs in the UE group, CCA detection by using the same sub-band-level CCA pattern.

11. The method according to claim 1, wherein CCA patterns used by the system-level nodes or the cell-level nodes or the UE-level nodes are appointed, or obtained by high-layer signaling notification.

12. The method according to claim 1, wherein when the transmission nodes are evolved Node B (eNBs), the CCA patterns are exchanged in the following three manners:
manner 1: information of CCA patterns of eNBs is exchanged between eNBs via an X2 interface; after receiving information of a CCA pattern of an eNB, each of adjacent eNBs of the eNB initiates a random backoff counter, and one of the adjacent eNBs of which a random backoff value is first reduced to 0 performs frequency shift for a fixed value on the basis of the received CCA pattern, maintains a CCA pattern list, notifies eNBs adjacent to the eNB of which a random backoff value is first reduced, of the CCA pattern list, and stops an information exchange operation until the list has a predefined number of reusable nodes; wherein if random backoff values of a plurality of eNBs are reduced to 0 at the same time, any one of the following operations is executed: each of the eNBs generates a random number, and determines a shift of a CCA pattern of the eNB according to a magnitude of the random number; a random backoff mechanism is re-executed; or a main eNB is selected, and CCA patterns allocated to remaining eNBs by the main eNB are received;

manner 2: an eNB notifies, via an X2 interface, adjacent eNBs of the eNB of a CCA pattern used for CCA detection, and after receiving information of the CCA pattern, each of the adjacent eNBs adopts pattern frequency domain location information contained in the received information of the CCA pattern during the non-occupancy period, the signal reserving period and the data transmission period of the channel; or manner 3: an eNB notifies, via an X2 interface, adjacent eNBs of the eNB of information of a CCA pattern, and after receiving the information of the CCA pattern, each of the adjacent eNBs sends feedback information for the CCA pattern.

13. The method according to claim 1, wherein when the transmission nodes are UEs, the exchange of the CCA patterns comprises:
   receiving, by the UEs, CCA patterns for CCA detection, broadcast by an eNB; or
   receiving, by the UEs, high-layer signaling which comprises the CCA patterns for CCA detection performed by the UEs.

14. The method according to claim 1, wherein the CCA patterns are determined by one or more of a frequency domain initial location, a frequency domain shift, a resource successive length, a cluster size, a period T, a frequency domain bandwidth or a cluster quantity.

15. The method according to claim 14, wherein a frequency domain initial location of a node is calculated as follows:

$$K=(v+f\text{vshift})\bmod N\text{resource}$$

$$v=0,1,\ldots,f-1, v\text{shift}=\text{NID}\langle\text{Cell}\rangle\bmod N;$$

wherein k denotes the frequency domain initial location, f denotes a number of resources successively occupied by the node, vshift denotes a frequency domain shift, N denotes a total number of reused nodes, Nresource denotes a total number of resources, and NID<Cell>denotes an Identifier (ID) of a cell.

16. A device for managing a pattern on an unlicensed carrier, applied to transmission nodes, the transmission nodes comprising one or more of the following types: system-level nodes, cell-level nodes or User Equipment (UE)-level nodes, the device comprising a processor and memory storing a set of instructions, wherein the instructions, when being executed by the processor, cause the processor to perform at least one of the following actions:
   perform, by transmission nodes, at least one of the following actions: performing clear Channel Assessment (CCA) detection during different stages of the CCA detection according to CCA patterns of the stages, or transmitting at least one of a signal or data according to patterns of the stages; or
   exchanging the CCA patterns between the transmission nodes;
wherein the stages of CCA detection comprise at least one of the following stages: a non-occupancy period; a signal reserving period; or a data transmission period; and
wherein a pattern used for CCA detection during the non-occupancy period comprises one of the following:
   a CCA detection pattern having equal intervals in the frequency domain and adopting a Resource Block (RB) as a minimum resource granularity;
   a CCA detection pattern having unequal intervals in the frequency domain and adopting an RB as a minimum resource granularity;
   a CCA detection pattern having equal intervals in the frequency domain and adopting a Resource Element (RE) as a minimum resource granularity;
   a CCA detection pattern having unequal intervals in the frequency domain and adopting an RE as a minimum resource granularity;
   a sub-band-level CCA detection pattern having equal intervals in the frequency domain; or
   a sub-band-level CCA detection pattern having unequal intervals in the frequency domain; or
wherein a pattern used for CCA detection during the signal reserving period comprises one of the following:
   if a reserved signal is sent on an entire bandwidth, there is no CCA detection pattern;
   if a reserved signal is sent on an entire bandwidth, frequency domain resources in one-to-one correspondence to CCA detection patterns are reserved for CCA pattern detection performed by reused nodes during the signal reserving period; or
   if a reserved signal is sent in frequency domain resources in one-to-one correspondence to CCA detection patterns, a pattern for sending the reserved signal is taken as a pattern used for CCA pattern detection performed by reused nodes during the signal reserving period; or
wherein a pattern used for CCA detection during the data transmission period comprises one of the following:
   if data is transmitted on an entire bandwidth, there is no CCA detection pattern;
   if data is transmitted on an entire bandwidth, frequency domain resources in one-to-one correspondence to CCA detection patterns are reserved for CCA pattern detection performed by reused nodes during the data transmission period;
   if data is transmitted on an entire bandwidth, pre-set REs on frequency domain resources in one-to-one correspondence to CCA detection patterns are reserved, or pre-set frequency domain REs within the data transmission period are reserved, for CCA pattern detection performed by reused nodes during the data transmission period; or
   if data is transmitted in frequency domain resources in one-to-one correspondence to CCA detection patterns, a pattern for transmitting the data is taken as a pattern used for CCA pattern detection performed by reused nodes during the signal reserving period.

* * * * *